(12) United States Patent
Hyoudou et al.

(10) Patent No.: US 9,008,109 B2
(45) Date of Patent: Apr. 14, 2015

(54) BUFFER MANAGEMENT OF RELAY DEVICE

(75) Inventors: Kazuki Hyoudou, Chofu (JP); Osamu Shiraki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 3 days.

(21) Appl. No.: 13/610,168

(22) Filed: Sep. 11, 2012

(65) Prior Publication Data

US 2013/0107890 A1 May 2, 2013

(30) Foreign Application Priority Data

Oct. 26, 2011 (JP) .................. 2011-234899

(51) Int. Cl.
| | |
|---|---|
| H04L 12/56 | (2006.01) |
| H04L 12/26 | (2006.01) |
| H04L 12/28 | (2006.01) |
| H04L 12/54 | (2013.01) |
| H04L 12/801 | (2013.01) |
| H04L 12/851 | (2013.01) |
| H04L 12/835 | (2013.01) |
| H04L 12/823 | (2013.01) |
| H04B 7/155 | (2006.01) |

(52) U.S. Cl.
CPC .............. H04L 47/17 (2013.01); H04L 47/24 (2013.01); H04L 47/30 (2013.01); H04L 47/32 (2013.01); H04B 7/155 (2013.01)

(58) Field of Classification Search
CPC ..... H04L 12/5682; H04L 43/16; H04L 47/10; H04L 47/12; H04L 47/30; H04L 47/32; H04L 47/29; H04L 47/2441; H04L 49/90; H04L 2012/5682
USPC ................... 370/229–235, 412–418
See application file for complete search history.

(56) References Cited

U.S. PATENT DOCUMENTS

| | | | | |
|---|---|---|---|---|
| 5,268,900 A | * | 12/1993 | Hluchyj et al. | 370/429 |
| 5,901,140 A | * | 5/1999 | Van As et al. | 370/236 |
| 6,957,369 B2 | * | 10/2005 | Bruckman et al. | 714/716 |
| 7,009,988 B2 | * | 3/2006 | Han et al. | 370/412 |
| 7,508,763 B2 | * | 3/2009 | Lee | 370/235 |
| 7,724,755 B2 | * | 5/2010 | Matsumoto et al. | 370/412 |
| 7,738,410 B2 | * | 6/2010 | Senga | 370/312 |
| 7,792,118 B2 | * | 9/2010 | Chao et al. | 370/395.1 |
| 8,018,851 B1 | * | 9/2011 | Medina et al. | 370/235 |
| 8,149,703 B2 | * | 4/2012 | Kostoff et al. | 370/232 |
| 8,792,350 B2 | * | 7/2014 | Matsuoka | 370/235 |

(Continued)

FOREIGN PATENT DOCUMENTS

| | | |
|---|---|---|
| JP | 2000-209250 | 7/2000 |
| JP | 2000-510308 | 8/2000 |

(Continued)

*Primary Examiner* — Wutchung Chu
(74) *Attorney, Agent, or Firm* — Staas & Halsey LLP

(57) ABSTRACT

There is provided a relay device including: a buffer configured to store a received frame; a discarding unit configured to discard the received frame, when a utilization amount of the buffer exceeds a first value set corresponding to a communication type of the received frame; a first calculating unit configured to calculate the utilization amount of the buffer for each communication type at least two points in time, and calculate an amount of change in the utilization amount of the buffer for each communication type; and a setting unit configured to calculate the first value for each communication type, based on the amount of change in the utilization amount, and set the first value in the discarding unit.

6 Claims, 32 Drawing Sheets

(56) References Cited

U.S. PATENT DOCUMENTS

| | | | |
|---|---|---|---|
| 8,824,294 B2* | 9/2014 | Halabi et al. | 370/235 |
| 2002/0071387 A1* | 6/2002 | Horiguchi et al. | 370/229 |
| 2002/0085636 A1* | 7/2002 | Uenoyama et al. | 375/240.12 |
| 2002/0093910 A1* | 7/2002 | Yazaki et al. | 370/229 |
| 2002/0097727 A1* | 7/2002 | Prakash | 370/395.42 |
| 2002/0118691 A1* | 8/2002 | Lefebvre et al. | 370/419 |
| 2002/0126673 A1* | 9/2002 | Dagli et al. | 370/392 |
| 2002/0136163 A1* | 9/2002 | Kawakami et al. | 370/229 |
| 2002/0141427 A1* | 10/2002 | McAlpine | 370/413 |
| 2002/0159388 A1* | 10/2002 | Kikuchi et al. | 370/229 |
| 2003/0016625 A1* | 1/2003 | Narsinh et al. | 370/230 |
| 2003/0016628 A1* | 1/2003 | Kadambi et al. | 370/235 |
| 2003/0043742 A1* | 3/2003 | De Maria et al. | 370/230 |
| 2003/0058793 A1* | 3/2003 | Rochon et al. | 370/229 |
| 2003/0161311 A1* | 8/2003 | Hiironniemi | 370/392 |
| 2004/0062200 A1* | 4/2004 | Kesavan | 370/235 |
| 2004/0071086 A1* | 4/2004 | Haumont et al. | 370/230 |
| 2004/0090915 A1* | 5/2004 | Zhong et al. | 370/230 |
| 2007/0280106 A1* | 12/2007 | Lund | 370/230 |
| 2008/0225703 A1* | 9/2008 | Rider et al. | 370/229 |
| 2011/0130099 A1* | 6/2011 | Madan et al. | 455/63.1 |
| 2011/0222406 A1* | 9/2011 | Persson et al. | 370/236 |
| 2013/0088968 A1* | 4/2013 | Kim et al. | 370/235 |

FOREIGN PATENT DOCUMENTS

| | | |
|---|---|---|
| JP | 2004-104192 | 4/2004 |
| JP | 2008-271017 | 11/2008 |
| WO | 97/43869 | 11/1997 |

* cited by examiner

FIG. 9

| FLOW | UTILIZATION AMOUNT OF SHARED BUFFER (CHANGE AMOUNT) | | | |
|---|---|---|---|---|
| | $t_0$ | $t_1$ | $t_2$ | $t_3$ |
| 1 | 0(0) | 2000 (+2000) | 1500 (-500) | 1500 (0) |
| 2 | 0(0) | 1500 (+1500) | 500 (-1000) | 1000 (+500) |
| 3 | 0(0) | 0(0) | 500 (+500) | 1200 (+700) |
| 4 | 0(0) | 800 (+800) | 1200 (+400) | 600 (-600) |
| TOTAL | 0(0) | 4300 (+4300) | 3700 (-600) | 4300 (+600) |

FIG. 15
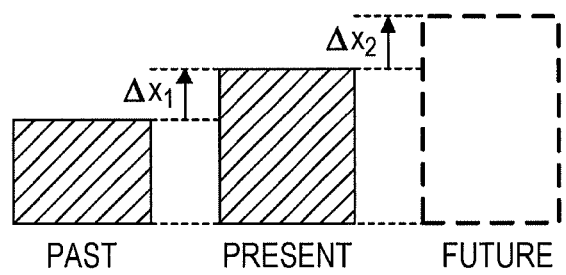
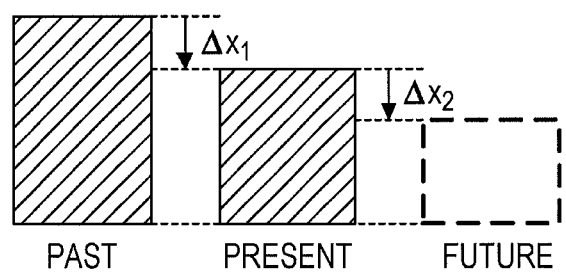

FIG. 21

| FLOW | EPD | UTILIZATION AMOUNT OF SHARED BUFFER (CHANGE AMOUNT) | | | |
|---|---|---|---|---|---|
| | | $t_0$ | $t_1$ | $t_2$ | $t_3$ |
| 1 | ON | 0(0) | 2000 (+2000) | 1500 (-500) | 1500 (0) |
| 2 | OFF | 0(0) | 1500 (+1500) | 500 (-1000) | 1000 (+500) |
| 3 | ON | 0(0) | 0(0) | 500 (+500) | 1200 (+700) |
| 4 | ON | 0(0) | 800 (+800) | 1200 (+400) | 600 (-600) |
| TOTAL | — | 0(0) | 4300 (+4300) | 3700 (-600) | 4300 (+600) |

FIG. 24

|         | $t_0$         | $t_1$ | $t_2$ | $t_3$ |
|---------|---------------|-------|-------|-------|
| NCBact  | 0             | 3     | 4     | 4     |
| Ted_min | INITIAL VALUE | 1200  | 1000  | 1000  |
| Ted_max | INITIAL VALUE | 1600  | 1200  | 1200  |

FIG. 25

| FLOW | $t_0$ | $t_1$ | $t_2$ | $t_3$ |
|---|---|---|---|---|
| 1 | 3000 | 1600 | ← | ← |
| 2 | — | — | — | — |
| 3 | 3000 | ← | ← | 1250 |
| 4 | 3000 | 1600 | ← | ← |

BUFFER MANAGEMENT OF RELAY DEVICE

CROSS-REFERENCE TO RELATED APPLICATION

This application is based upon and claims the benefit of priority of the prior Japanese Patent Application No. 2011-234899, filed on Oct. 26, 2011, the entire contents of which are incorporated herein by reference.

FIELD

The embodiments discussed herein relate to buffer management of a relay device.

BACKGROUND

Networks having different characteristics may be integrated for the purpose of simplifying information system operations and management and the like. Hereinbelow, a network constructed by integrating a plurality of networks is called an integrated network.

Recently, the integration of, for example, local area networks (LANs) and storage area networks (SANs) is being carried out. However, there is a problem in that the fundamental technology may be different when integrating a LAN and a SAN. For example, the standard specification used in a LAN is Ethernet (trademark), while the standard specification used in a SAN is Fibre Channel. Thus when integrating a LAN and a SAN, technologies such as Fibre Channel over Ethernet (FCoE) or data center bridging (DCB) are used.

Multiple types of communications with differing allowance rates for dropped frames may be conducted in an integrated network built by the integration of a LAN and a SAN. For example, a characteristic of FCoE is that storage access performance drops dramatically when frames are dropped. Although the dropping of frames is allowed to some extent in video and audio streaming, FCoE exhibits poor quality due to breaks in video and audio streams when the dropping of frames becomes noticeable. Moreover, a transmission control protocol (TCP) used when communicating between servers includes a mechanism to conduct re-transmission when frames are dropped.

Conventionally, flow control using a pause frame is known as a technique to reduce the dropping of frames in a relay device. In this technology, when a utilization amount of a buffer in a network switch approaches its upper limit and there is a possibility that the dropping of frames may occur if more frames are received, a pause frame is transmitted to the frame transmission source to cause the transmission of frames to be suspended. However, this technique has a problem in that to suspend the transmission to each port by the transmitting devices, the transmission of frames that are allowed to be dropped is also suspended.

Meanwhile, in priority-based flow control (PFC) prescribed in DCB, only the frame transmission of communication types (also called flows) prone to frame dropping may be suspended to conduct flow control for each of eight types of priorities prescribed in Ethernet. However, frequently only the transmission of specified flows is suspended when this type of simple control is conducted.

A conventional technique of determining a transmission suspension time for each port also exists in relation to flow control. However, flow control may not be conducted appropriately since the criteria for determining whether or not to conduct the flow control are simple.

A conventional technique called early packet drop (EPD) also exists in which buffer usage limits are provided for each flow to discard frames when the limit is exceeded. According to this technique, the condition of blocking bandwidth control (namely, head-of-line (HOL) blocking) due to frames of specified flows occupying a buffer and blocking the passage of frames from other flows, for example weighted round robin (WRR) or enhanced transmission selection (ETS), is avoided.

However in EPD, it is difficult to balance both reducing the overflow of buffers and securing bandwidth without appropriately setting a threshold for discarding frames. For example, if the threshold is too high the buffers may overflow, and if the threshold is too low, the discarding of frames for flows in which EPD is enabled may occur very easily, and thus a noticeable drop in performance may arise.

There is a technique for monitoring the use of a shared buffer and determining a threshold based on the utilization amount of the buffer at a time when a frame arrives in relation to EPD. However, proper control may not be conducted with this type of technique. For example, when there is a flow without congestion of communication but the utilization amount is high, the threshold may be lowered even though normally the threshold does not have to be lowered.

Another conventional technique includes a spool memory provided between a transmitting buffer and a receiving buffer and the number of buffers in the spool memory assigned to ports is determined according to communication conditions (buffer utilization rate) of the ports. However, the same types of problems as described above occur with this technique since the number of assigned buffers is determined according to the buffer utilization rate at a predetermined point in time.

There is also a technique that predicts future increases and decreases in the number of packets in a buffer based on increases and decreases in the number of packets in the buffer and uses the predicted value to determine a threshold to detect buffer overflows. However, this technique may not be applied to bandwidth control based on WRR, ETS and the like.

The above techniques are discussed in Japanese Laid-open Patent Publication No. 2000-209250, Japanese National Publication of International Patent Application No. 2000-510308, Japanese Laid-open Patent Publication No. 2008-271017, and Japanese Laid-open Patent Publication No. 2004-104192.

SUMMARY

According to an aspect of the embodiment, there is provided a relay device including: a buffer configured to store a received frame; a discarding unit configured to discard the received frame, when a utilization amount of the buffer exceeds a first value set corresponding to a communication type of the received frame; a first calculating unit configured to calculate the utilization amount of the buffer for each communication type at least two points in time, and calculate an amount of change in the utilization amount of the buffer for each communication type; and a setting unit configured to calculate the first value for each communication type, based on the amount of change in the utilization amount, and set the first value in the discarding unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is an example of a utilization amount table stored in a buffer data storing unit;

FIG. 15 describes changes in a buffer utilization amount;

FIG. 21 is an example of a utilization amount table stored in a buffer data storing unit;

FIG. 24 describes a threshold calculation method;

FIG. 25 describes a threshold calculation method;

DESCRIPTION OF EMBODIMENTS

First Embodiment

Figure 1:
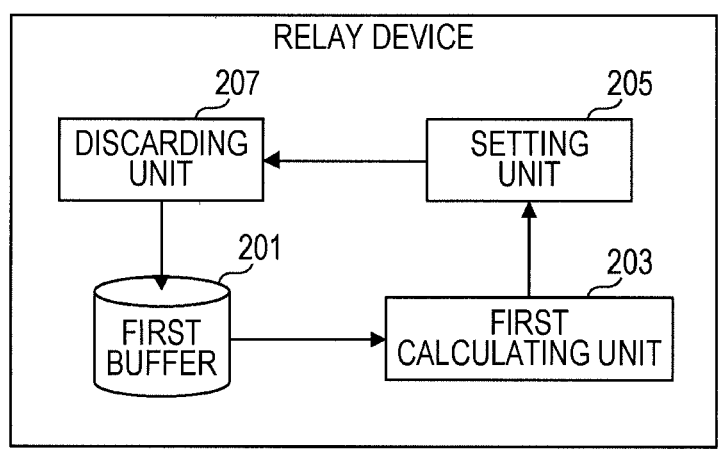
FIG. 1 is a functional block drawing of a relay device according to a first embodiment.

FIG. 1 is a functional block drawing of a relay device according to a first embodiment. The relay device according to the first embodiment is a relay device for transferring frames received through an integrated network, for example, to a target device. The relay device has a first buffer 201, a first calculating unit 203, a setting unit 205, and a discarding unit 207.

The first calculating unit 203 calculates a utilization amount of the first buffer 201 and a numerical value indicating a change in the utilization amount and the like, and outputs the processing results to the setting unit 205. The setting unit 205 calculates a first threshold based on the processing results received from the first calculating unit 203, and sets the first threshold for the discarding unit 207. The discarding unit 207 discards received frames or stores received frames in the first buffer 201 based on the set first threshold.

Figure 2:
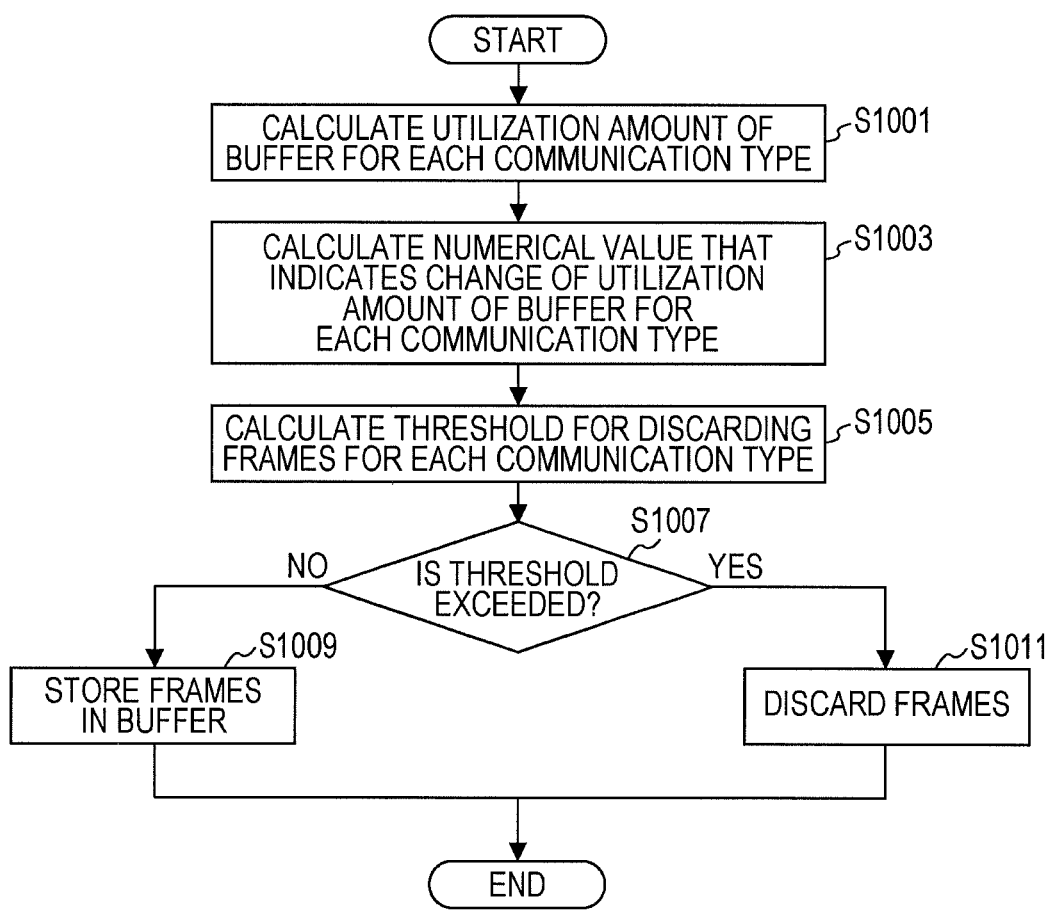
FIG. 2 illustrates a process flow of processes conducted by the relay device according to the first embodiment.

Operations of the relay device according to the first embodiment will be described next with reference to FIG. 2. The first calculating unit 203 first calculates the utilization amount of the first buffer 201 for each communication type at least two points in time, and stores the utilization amounts in a storage device (FIG. 2: operation S1001). The communication types are determined from information included in the header of the frames, for example.

The first calculating unit 203 then uses the utilization amounts calculated in operation S1001 to calculate, for each communication type, a numerical value indicating a change in the utilization amount of the first buffer 201, and stores the numerical values in the storage device (operation S1003). For example, the calculating unit 203 calculates the difference between the latest utilization amount and the utilization amount at a predetermined point in time beforehand.

The setting unit 205 then calculates the first threshold for discarding frames for each communication type based on the numerical values indicating the changes in the utilization amount of the first buffer 201 calculated by the first calculating unit 203, and sets the first thresholds for the discarding unit 207 (operation S1005). For example, the setting unit 205 calculates a second threshold smaller than the previously set first thresholds for a communication type in which the utilization amount of the first buffer 201 increases. For example, the setting unit 205 calculates a third threshold equal to or larger than the previously set first thresholds for a communication type in which the utilization amount of the first buffer 201 decreases. The second and third thresholds are set in the discarding unit 207 as the first thresholds for communication types, respectively.

The discarding unit 207 determines whether the utilization amount of the first buffer 201 exceeds the first threshold calculated, which is calculated for the communication type of the received frame, due to frames of a communication type that matches the communication type of the frame that is received and stored in the first buffer 201 (operation S1007). If the discarding unit 207 determines that the first threshold is not exceeded (operation S1007: No route), the discarding unit 207 stores the received frames in the first buffer 201 (operation S1009), and the processing is completed. On the other hand, if the discarding unit 207 determines that the first threshold has been exceeded (operation S1007: Yes route), the discarding unit 207 discards the received frames (operation S1011), and the processing is completed.

By implementing the above processing, frame discarding is controlled so as to be limited by the communication type and buffer overflow is rendered more unlikely. Thus, deterioration in communication quality may be suppressed.

Second Embodiment

Figure 3:
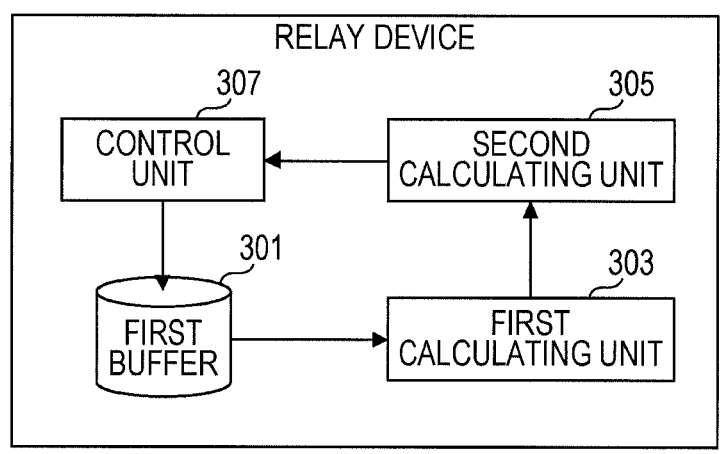
FIG. 3 is a functional block drawing of a relay device according to a second embodiment.

FIG. 3 is a functional block drawing of a relay device according to a second embodiment. The relay device according to the second embodiment is a relay device for transferring frames received through an integrated network, for example, to a target device. The relay device has a first buffer 301, a first calculating unit 303, a second calculating unit 305, and a control unit 307.

The first calculating unit 303 conducts a process to calculate a utilization amount of a first buffer 301 and a numerical value indicating a change in the utilization amount, and outputs the processing results to the second calculating unit 305. The second calculating unit 305 calculates a threshold based on the processing results from the first calculating unit 303, and outputs the threshold to the control unit 307. The control unit 307 controls an inflow data amount of frames to the first buffer 301 based on the threshold received from the second calculating unit 305.

Figure 4:
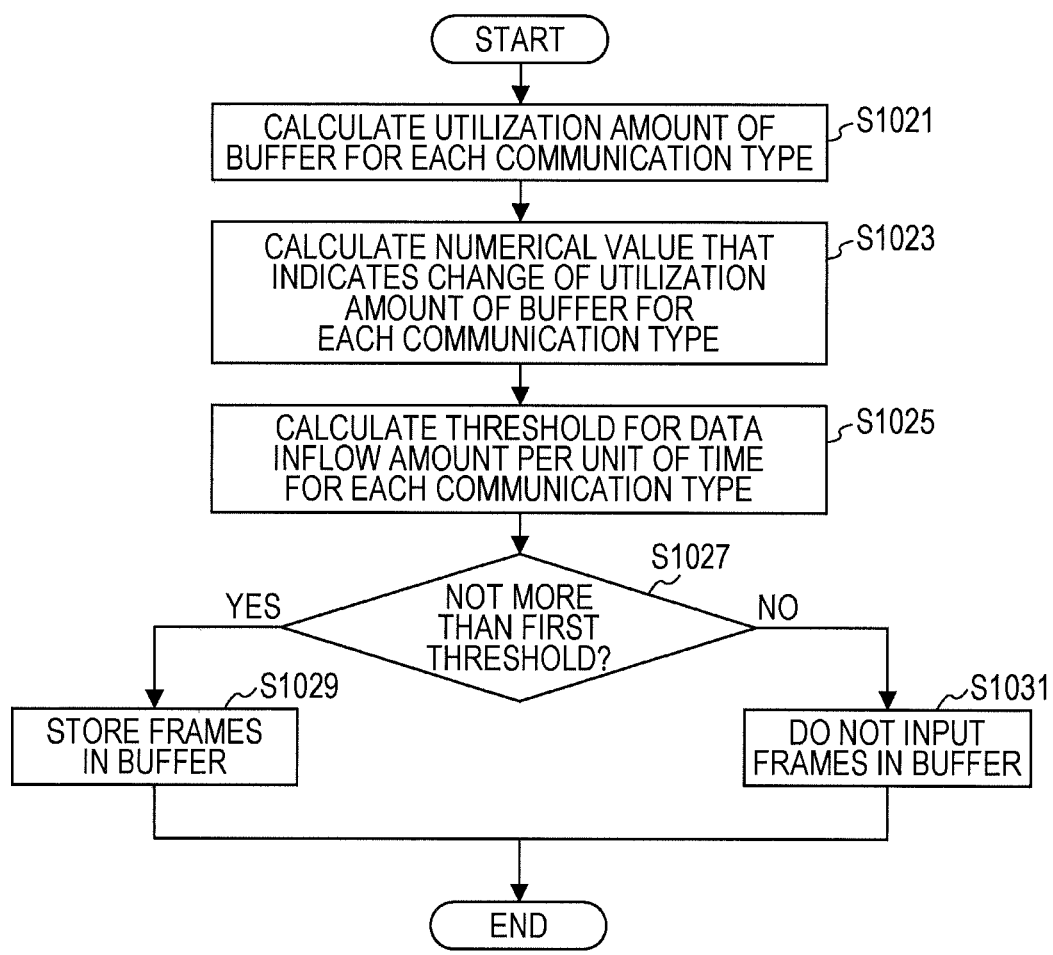
FIG. 4 illustrates a process flow of processes conducted by the relay device according to the second embodiment.

Operations of the relay device according to the second embodiment will be described next with reference to FIG. 4. The first calculating unit 303 first calculates, for each communication type, a utilization amount of the first buffer 301 at least two points in time, and stores the utilization amounts in a storage device (FIG. 4: operation S1021). The communication type is determined from information included in the header of the frames for example.

The first calculating unit 303 then uses the utilization amounts calculated in operation S1021 to calculate, for each communication type, a numerical value indicating a change in the utilization amount of the first buffer 301, and stores the numerical values in the storage device (operation S1023). For example, the first calculating unit 303 calculates a difference between the latest utilization amount and the utilization amount at a predetermined point in time beforehand.

The second calculating unit 305 calculates, for each communication type, a first threshold in relation to the frame inflow data amount per unit of time based on the numerical values indicating changes in the utilization amount of the first buffer 301 calculated by the first calculating unit 303, and outputs the first thresholds to the control unit 307 (operation S1025). For example, thresholds for communication types in which the utilization amount of the first buffer 301 increases are set as first thresholds to be smaller than thresholds for communication types in which the utilization amount of the first buffer 301 decreases.

The control unit 307 then determines whether the inflow data amount per unit of time of frames of the communication type that matches the communication type of the received frame even if the received frame is stored in the first buffer 301, is equal to or below the first threshold (operation S1027). If the inflow data amount per unit of time is determined to be equal to or less than the first threshold (operation S1027: Yes route), the control unit 307 stores the received frame in the first buffer 301 (operation S1029), and the processing is completed. Meanwhile, if the inflow data amount per unit of time is determined to be greater than the first threshold (operation S1027: No route), the control unit 307 does not store the received frame in the first buffer 301 and causes the received frame to be held in stand-by, for example, in a spare buffer provided separately from the first buffer 301 (operation S1031), and the processing is completed.

Implementing the above processing allows the relay device to flexibly handle buffer overflows since an appropriate inflow data amount is set with respect to changes to the buffer utilization amount. Thus, deterioration in communication quality may be suppressed.

Third Embodiment

Figure 5:
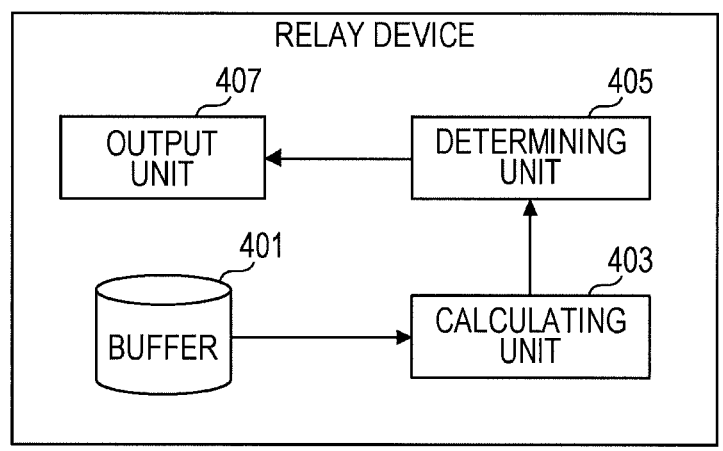
FIG. 5 is a functional block drawing of a relay device according to a third embodiment.

FIG. 5 is a functional block drawing of a relay device according to a third embodiment. The relay device according to the third embodiment is a relay device for transferring frames received through an integrated network, for example, to a target device. The relay device has a buffer 401, a calculating unit 403, a determining unit 405, and an output unit 407.

The calculating unit 403 conducts processing to calculate a utilization amount of the buffer 401 and a numerical value indicating a change in the utilization amount, and outputs the processing results to the determining unit 405. The determining unit 405 determines whether to cause the transmission of frames to be suspended based on the processing results from the calculating unit 403, and instructs the output unit 407 to transmit a suspension request if the transmission of frames is to be suspended. The output unit 407 outputs the suspension request signal to request the suspension of the transmission of frames based on the instruction from the determining unit 405.

Figure 6:
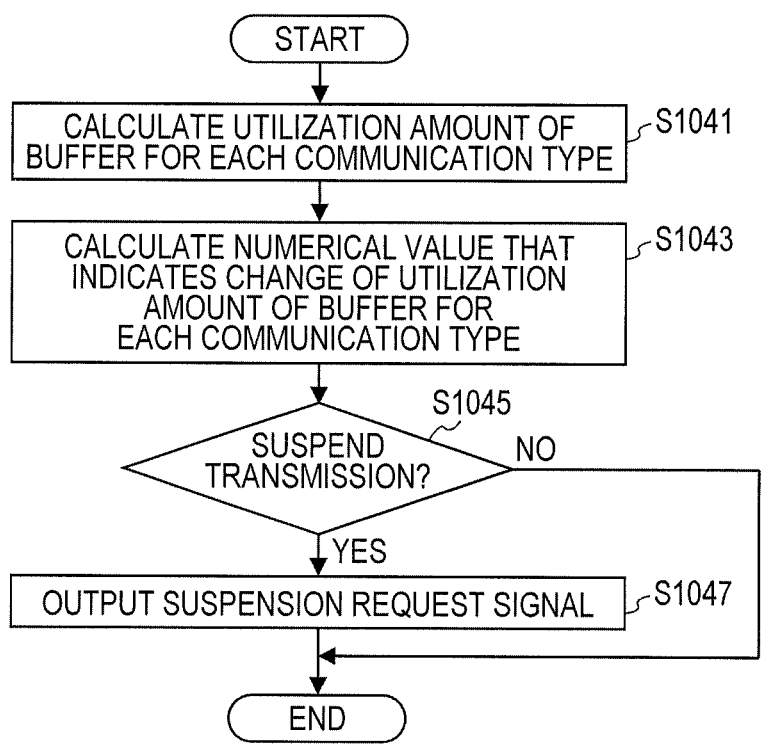
FIG. 6 illustrates a process flow of processes conducted by the relay device according to the third embodiment.

Operations of the relay device according to the third embodiment will be described next with reference to FIG. 6. The calculating unit 403 first calculates, for each communication type, a utilization amount of the buffer 401 at least two points in time, and stores the utilization amounts in a storage device (FIG. 6: operation S1041). The communication types are determined from information included in the header of the frames for example.

The calculating unit 403 then uses the utilization amounts calculated in operation S1041 to calculate, for each communication type, a numerical value indicating a change in the utilization amount of the buffer 401, and stores the numerical values in the storage device (operation S1043). For example, the first calculating unit 403 calculates a difference between the latest utilization amount and the utilization amount at a predetermined point in time beforehand.

The determining unit 405 determines whether to cause the transmission of frames for each communication type to be suspended based on the numerical values indicating changes in the utilization amount in the buffer 401 (operation S1045). For example, the transmission of frames of a communication type in which the utilization amount of the buffer 401 is increasing noticeably is suspended. If it is determined that the transmission of frames are not to be suspended (operation S1045: No route), the processing is completed.

If it is determined that the transmission of frames is to be suspended (operation S1045: Yes route), the determining unit 405 instructs the output unit 407 to transmit a suspension request. Herein, it is assumed that the transmission of frames related to a first communication type is to be suspended. Accordingly, the output unit 407 creates a suspension request signal that requests the suspension of the transmission of frames related to the first communication type, and outputs the suspension request to the transmission source device of the frames related to the first communication type (operation S1047). Frames, including the suspension request signal, output by the output unit 407 are transmitted to the transmission source device of the frames through a port (not illustrated) of the relay device. The processing is then completed.

According to the above processing, buffer overflow may be suppressed since the transmission of frames is appropriately suspended in correspondence with a change to the buffer utilization amount for each communication type. Thus, deterioration in communication quality may be suppressed.

Fourth Embodiment

Figure 7:
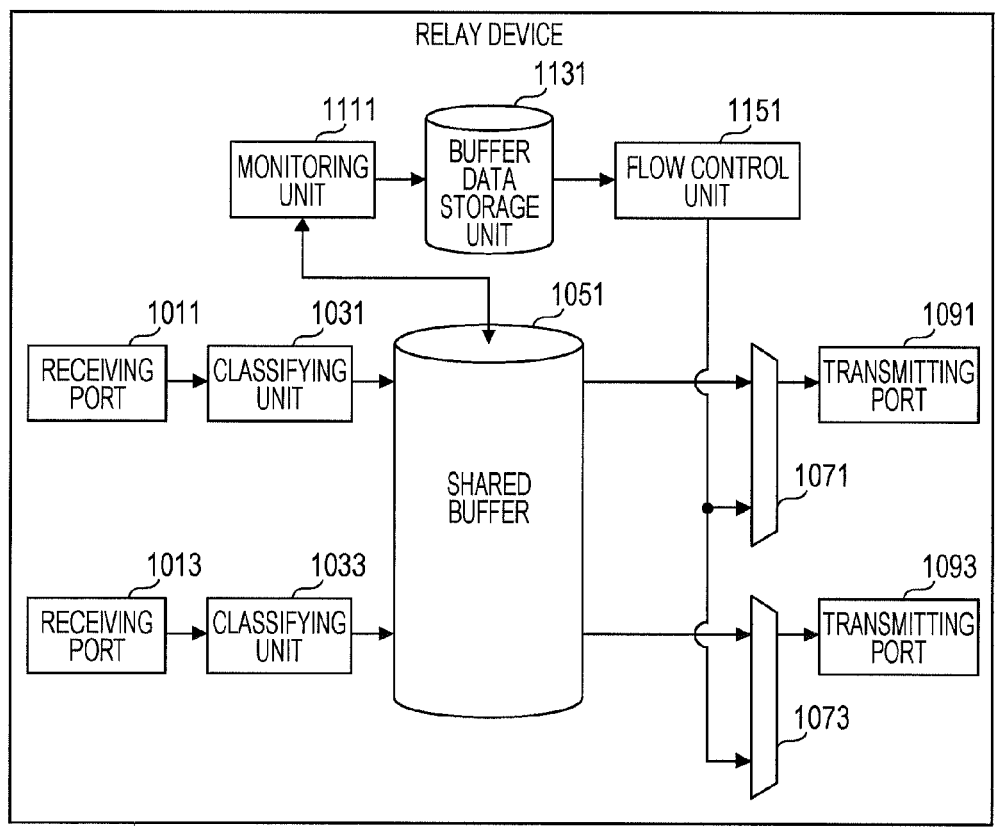
FIG. 7 is a functional block drawing of a relay device according to a fourth embodiment.

FIG. 7 is a functional block drawing of a relay device according to a fourth embodiment. The relay device of the fourth embodiment is, for example, a layer 2 switch. The relay device includes receiving ports 1011 and 1013, classifying units 1031 and 1033, a shared buffer 1051, selecting units 1071 and 1073, transmitting ports 1091 and 1093, a monitoring unit 1111, a buffer data storage unit 1131, and a flow control unit 1151.

The receiving port 1011 outputs received frames to the classifying unit 1031. The classifying unit 1031 adds information for identifying the flow (also called communication types) to the input frames and stores the frames in the shared buffer 1051. The selecting unit 1071 outputs input frames to the transmitting port 1091. The transmitting port 1091 transmits input frames to a target device. The monitoring unit 1111 calculates a utilization amount of the shared buffer 1051 for each flow. The monitoring unit 1111 calculates an amount of changes in the utilization amount of the shared buffer 1051 and stores the amount of changes in the buffer data storage unit 1131. The flow control unit 1151 determines whether or not to conduct flow control based on data stored in the buffer data storage unit 1131, and if it is determined that flow control is to be conducted, creates a pause frame and outputs the same to the selecting units 1071 and 1073.

The function of the receiving port 1013 is similar to that of the receiving port 1011. The function of the classifying unit 1033 is similar to that of the classifying unit 1031. The function of the selecting unit 1073 is similar to that of the selecting unit 1071. The function of the transmitting port 1093 is similar to that of the transmitting port 1091.

In the present embodiment, the flow is determined according to, for example, communication protocol information, priority information, and virtual local area network (VLAN) information included in the frames. The flow is determined in the same way in other embodiments.

The operations of the relay device described in FIG. 7 will be explained hereinbelow using FIGS. 8 to 11.

Figure 8:
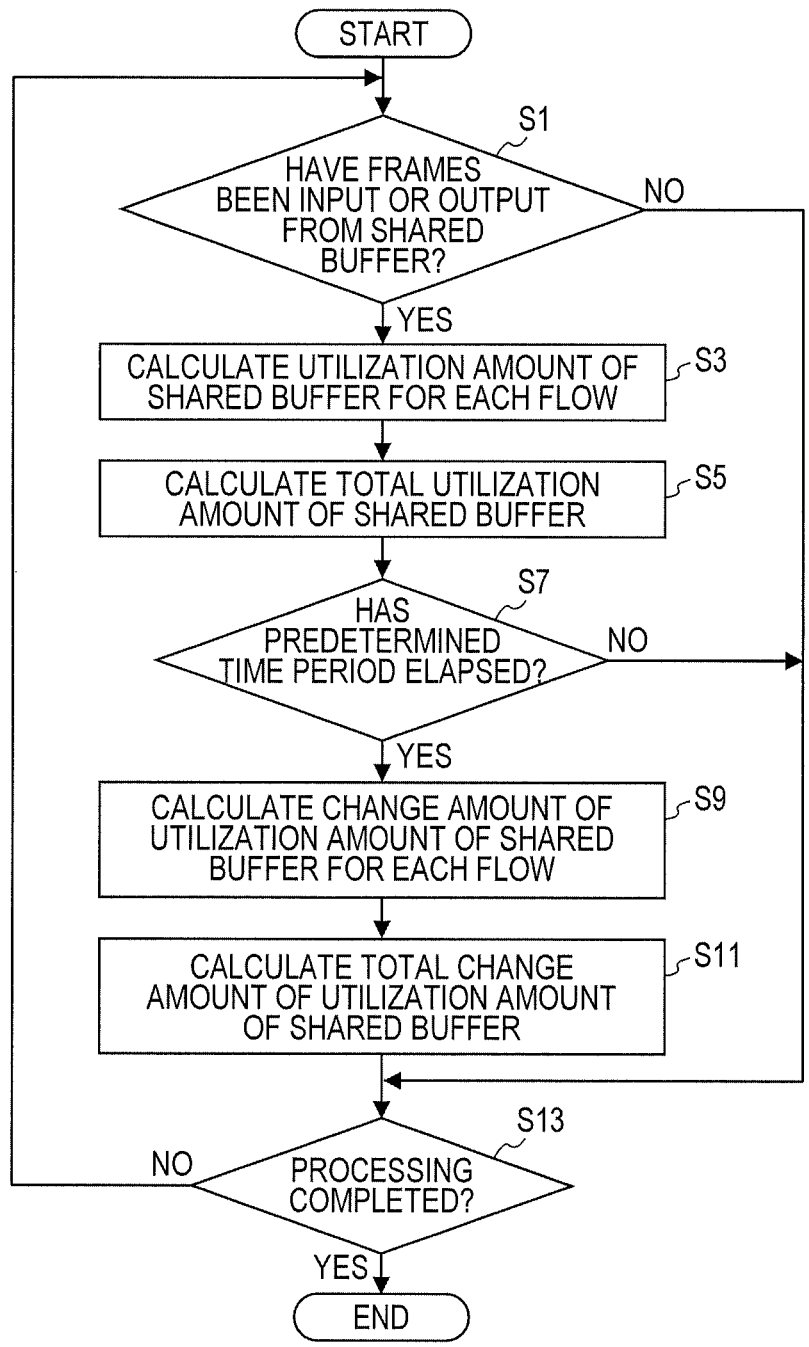
FIG. 8 illustrates a process flow of processes conducted by a monitoring unit.

First, the monitoring unit 1111 determines whether any frames have been input into or output from the shared buffer 1051 (FIG. 8: operation S1). That is, the monitoring unit 1111 determines whether there have been any changes in the utilization amount of the shared buffer 1051.

If no input or output of frames into or from the shared buffer 1051 have occurred (operation S1: No route), the process moves to operation S13 since the utilization amount of the shared buffer 1051 does not have to be calculated again. If frames have been input into or output from the shared buffer 1051 (operation S1: Yes route), the monitoring unit 1111 calculates the utilization amount of the shared buffer 1051 for each flow and stores the utilization amounts in a storage device (operation S3). The monitoring unit 1111 then calculates a total utilization amount of the shared buffer 1051 and stores the total utilization amount in the storage device (operation S5).

The monitoring unit 1111 then determines whether a predetermined time period has elapsed since previously calculating the amount of changes in the utilization amount of the shared buffer 1051 (operation S7). The predetermined time period used in operation S7 is a time interval to conduct the change amount calculation.

If the predetermined time period has not elapsed since the previous calculation of the amount of change in the utilization amount of the shared buffer 1051 (operation S7: No route), the process moves to operation S13 since the calculation of the amount of change does not have to be conducted yet. Conversely, if the predetermined time period has elapsed since the previous calculation of the amount of change in the utilization amount of the shared buffer 1051 (operation S7: Yes route), the monitoring unit 1111 calculates the amount of change in the utilization amount of the shared buffer 1051 for each flow and stores the amounts of change in a utilization amount table in the buffer data storage unit 1131 (operation S9). The monitoring unit 1111 further calculates a total change amount of the utilization amount of the shared buffer 1051 and stores the total change amount in the utilization amount table in the buffer data storage unit 1131 (operation S11).

FIG. 9 is an example of a utilization amount table stored in the buffer data storing unit 1131. In the example of FIG. 9, an amount of change in the utilization amount and a utilization amount at each point in time are stored for each flow.

The monitoring unit 1111 then ends the processing when a processing end instruction is received (operation S13: Yes route). If the processing is not completed (operation S13: No route), the processing returns to operation S1 to continue the processing.

As described above, the amount of change in the utilization amount of the shared buffer 1051 is calculated for each flow.

Figure 10:
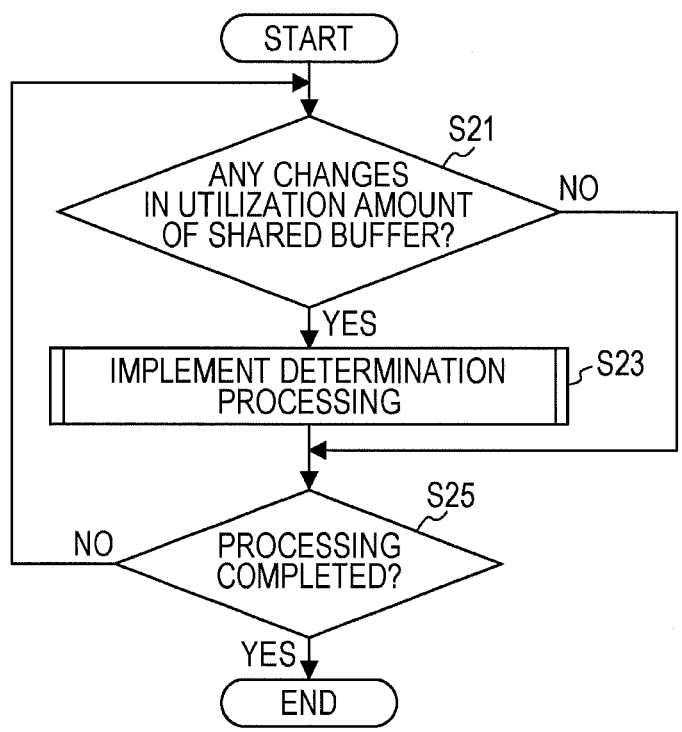
FIG. 10 illustrates a process flow of processes conducted by a flow control unit.

Processing conducted by the flow control unit 1151 will be described next with reference to FIGS. 10 and 11. First, the flow control unit 1151 uses the utilization amounts calculated in operations S3 and S5 or the amounts of change in the utilization amount calculated in operations S9 and S11 to determine whether the utilization amount of the shared buffer 1051 has changed or not (FIG. 10: operation S21). For example, the utilization amount is considered to have changed if the change in the utilization amount exceeds a previously set threshold.

If the utilization amount of the shared buffer 1051 has not changed (operation S21: No route), the processing moves to operation S25. Conversely, if the utilization amount of the shared buffer 1051 has changed (operation S21: Yes route), the flow control unit 1151 uses the utilization amount table stored in the buffer data storage unit 1131 to implement determination processing (operation S23). The determination processing is explained using FIG. 11.

Figure 11:
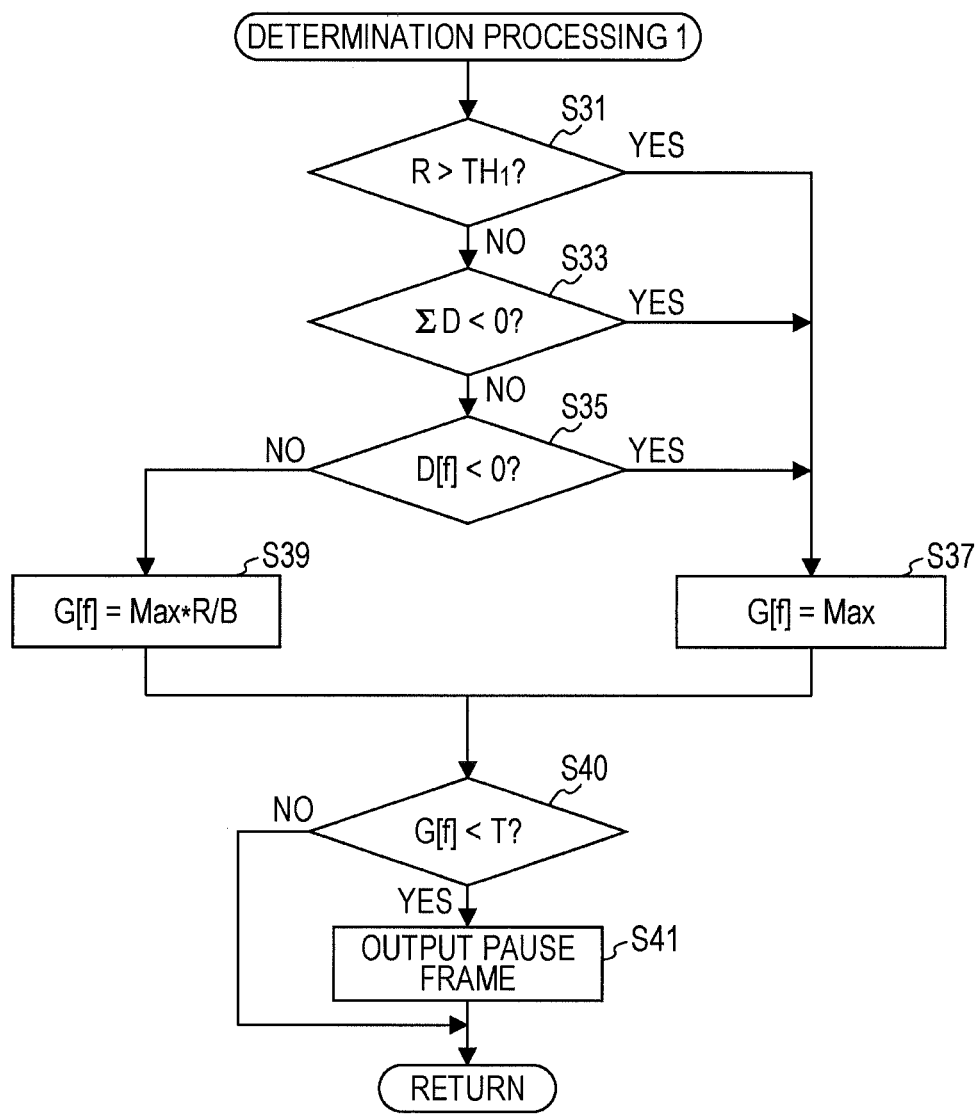
FIG. 11 illustrates a process flow of a determining process.

First, the flow control unit 1151 determines whether a buffer remainder R is greater than a predetermined threshold $TH_1$ (FIG. 11: operation S31). In operation S31, the buffer remainder R is calculated by subtracting the buffer utilization amount total $\Sigma U$ from the buffer capacity B. $TH_1$ is a predetermined threshold related to the buffer remainder. Hereinbelow, the buffer utilization amount of the flow f is "U[f]," the amount of change to the buffer utilization amount due to the flow f is "D[f]," and the inflow data amount per unit of time of the flow f to the shared buffer 1051 is "G[f]."

If the buffer remainder R is greater than the predetermined threshold TH1 (operation S31: Yes route), the flow control unit 1151 sets the inflow data amount G[f] of the flow f as the maximum G[f] (operation S37). This is because there is still space left in the shared buffer 1051. Herein, the maximum represents a wire rate (i.e., a theoretical maximum communication speed of the line).

Conversely, if the buffer remainder R is not greater than the predetermined threshold $TH_1$ (operation S31: No route), the flow control unit 1151 determines whether $\Sigma D$ is less than zero (operation S33). That is, the flow control unit 1151 determines whether the utilization amount of the shared buffer 1051 has decreased.

If $\Sigma D$ is less than zero (operation S33: Yes route), the flow control unit 1151 sets the inflow data amount G[f] of the flow f as the maximum G[f] (operation S37). Since the total utilization amount of the shared buffer 1051 exhibits a decreasing trend, the occurrence of a buffer overflow is unlikely even if the inflow data amount per unit of time to the shared buffer 1051 has increased.

Conversely, if the ΣD is not less than zero (operation S33: No route), the flow control unit 1151 determines whether D[f] is less than zero (operation S35). That is, the flow amount determining unit 1151 determines whether the buffer utilization amount of the flow f is decreasing or not.

If D[f] is less than zero (operation S35: Yes route), the flow control unit 1151 sets the inflow data amount G[f] of the flow f as the maximum G[f] (operation S37). Since the total utilization amount of the shared buffer 1051 exhibits a decreasing trend due to the flow f, the occurrence of a buffer overflow is unlikely even if the inflow data amount per unit of time of the flow f has increased.

Conversely, if D[f] is not less than zero (operation S35: No route), the flow control unit 1151 sets the inflow data amount G[f] of the flow f as G[f]=Max*R/B (operation S39). That is, the flow control unit 1151 assigns a smaller inflow data amount in correspondence with a smaller buffer remainder R.

The flow control unit 1151 then determines whether the inflow data amount G[f] set in operation S37 or operation S39 satisfies the equation G[f]<T (operation S40). "T" is a predetermined threshold related to the inflow data amount. If G[f] <T is not satisfied (operation S40: No route), the processing returns to the original processing since the transmission of frames for the flow f does not have to be suspended. Conversely, if G[f]<T is satisfied (operation S40: Yes route), the flow control unit 1151 creates a pause frame to request a frame transmission suspension with respect to the frame transmission source device for the flow f, and outputs the pause frame to the transmission source device (operation S41). According to the present embodiment, the pause frame is output to the selecting unit 1071 or 1073. Then, the processing returns to the original processing.

The determination processing described above may be conducted only for a flow in which a change in the buffer utilization amount occurs, or for all the flows.

Returning to the explanation of FIG. 10, the flow control unit 1151 then completes the processing when a processing end instruction is received (operation S25: Yes route). If the processing is not completed (operation S25: No route), the processing returns to operation S21 to continue the processing.

By implementing the processing described above, an appropriate flow control may be conducted in response to changes to the buffer utilization amount for each flow. As a result, the occurrence of overflows of the shared buffer 1051 may be suppressed. Moreover, since frames are not discarded unlike EPD (Early Packet Drop), flows in which frame discarding is not desired (e.g., FCoE) may also be handled. Furthermore, a shared buffer may be used effectively since the shared buffer is not divided for each port.

Fifth Embodiment

Figure 12:
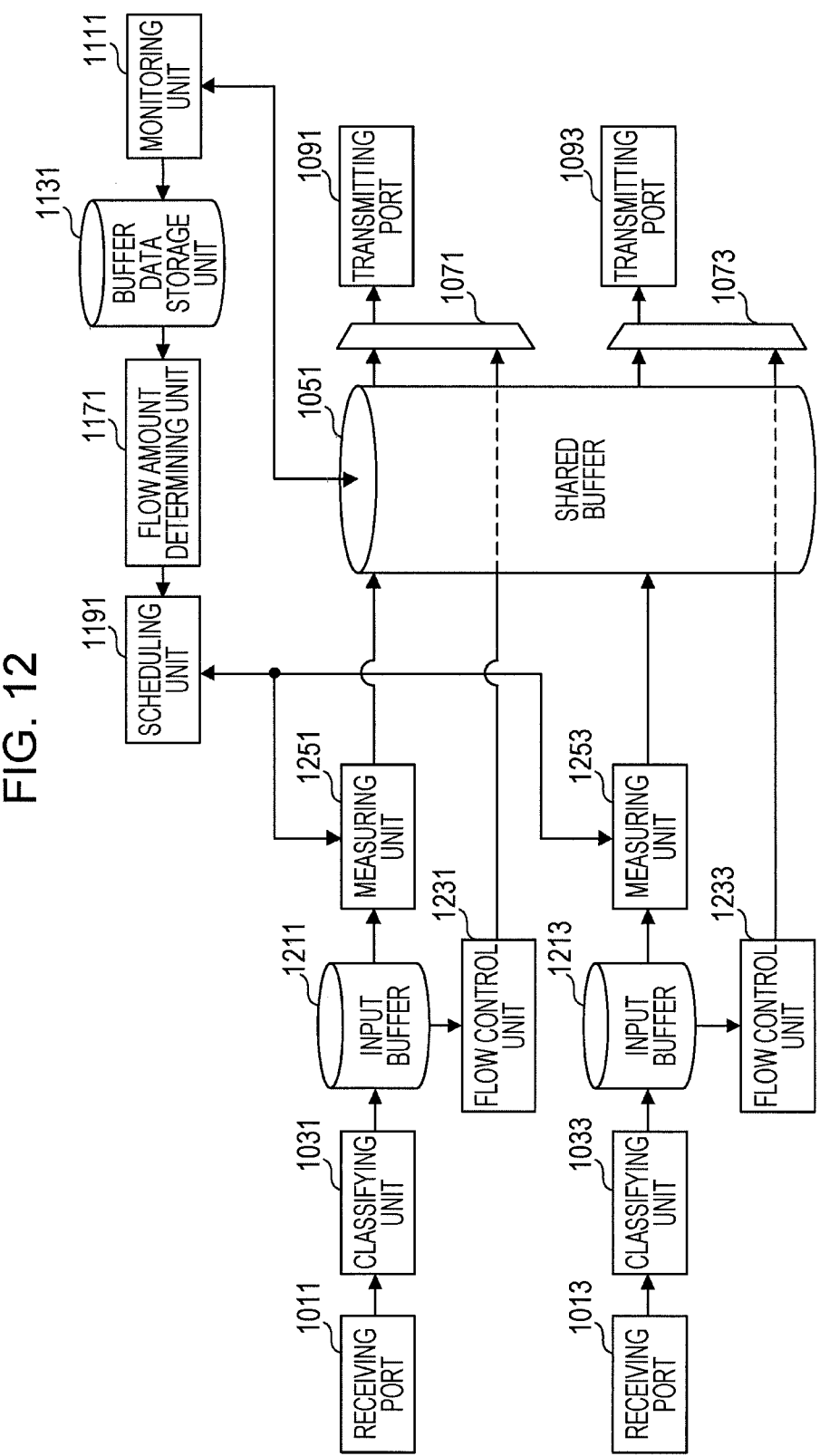
FIG. 12 is a functional block drawing of a relay device according to a fifth embodiment.

FIG. 12 is a functional block drawing of a relay device according to a fifth embodiment. The relay device of the fifth embodiment is, for example, a layer 2 switch. The relay device includes receiving ports 1011 and 1013, classifying units 1031 and 1033, input buffers 1211 and 1213, flow control units 1231 and 1233, measuring units 1251 and 1253, a shared buffer 1051, selecting units 1071 and 1073, transmitting ports 1091 and 1093, a monitoring unit 1111, a buffer data storage unit 1131, a flow amount determining unit 1171, and a scheduling unit 1191.

The receiving port 1011 outputs received frames to the classifying unit 1031. The classifying unit 1031 adds information for identifying the flow to the input frames and stores the frames in the input buffer 1211. The flow control unit 1231 determines whether or not to conduct flow control based on the utilization amount of the input buffer 1211, and if it is determined that flow control is to be conducted, creates a pause frame and outputs the same to the selecting unit 1071. The measuring unit 1251 manages the frame data amount that flows into the shared buffer 1051 from the input buffer 1211. The selecting unit 1071 outputs input frames to the transmitting port 1091. The transmitting port 1091 transmits input frames to a target device. The monitoring unit 1111 calculates a utilization amount of the shared buffer 1051 for each flow. The monitoring unit 1111 calculates a change amount of the utilization amount of the shared buffer 1051 and stores the change amount in the buffer data storage unit 1131. The flow amount determining unit 1171 calculates the frame data amount flowing into the shared buffer 1051 from the input buffers 1211 and 1213 per unit of time for each flow based on data stored in the buffer data storage unit 1131, and outputs the frame data amount to the scheduling unit 1191. The scheduling unit 1191 manages the order of the frames flowing into the shared buffer 1051 from the input buffers 1211 and 1213.

The function of the receiving port 1013 is similar to that of the receiving port 1011. The function of the classifying unit 1033 is similar to that of the classifying unit 1031. The function of the input buffer 1213 is similar to that of the input buffer 1211. The function of the flow control unit 1233 is similar to that of the flow control unit 1231. The function of the measuring unit 1253 is similar to that of the measuring unit 1251. The function of the selecting unit 1073 is similar to that of the selecting unit 1071. The function of the transmitting port 1093 is similar to that of the transmitting port 1091.

The operations of the relay device described in FIG. 12 will be explained hereinbelow. The explanation of the processing by the monitoring unit 1111 is the same as that of the fourth embodiment and will be omitted.

Figure 13:
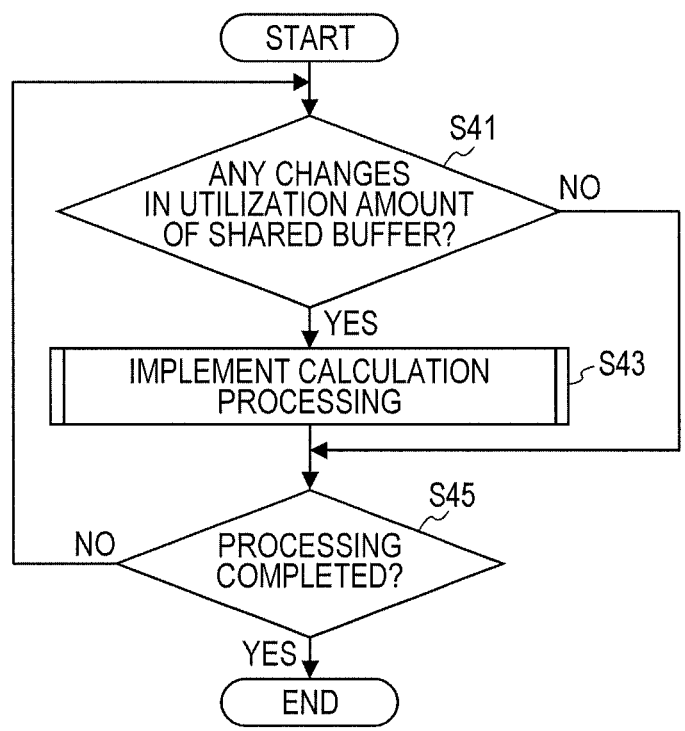
FIG. 13 illustrates a process flow of processes conducted by a flow amount determining unit.

First, processing conducted by the flow amount determining unit 1171 will be explained using FIG. 13. First, the flow amount determining unit 1171 uses the utilization amounts calculated in operations S3 and S5 or the amounts of change in the utilization amount calculated in operations S9 and S11 to determine whether the utilization amount of the shared buffer 1051 has changed or not (FIG. 13: operation S41). For example, the utilization amount is considered to have changed if the change in the utilization amount exceeds a previously set threshold.

If the utilization amount of the shared buffer 1051 has not changed (operation S41: No route), the processing moves to operation S45. Conversely, if the utilization amount of the shared buffer 1051 has changed (operation S41: Yes route), the flow amount determining unit 1171 uses the utilization amount table stored in the buffer data storage unit 1131 and implements determination processing (operation S43). The determination processing is explained with reference to FIG. 14.

Figure 14:
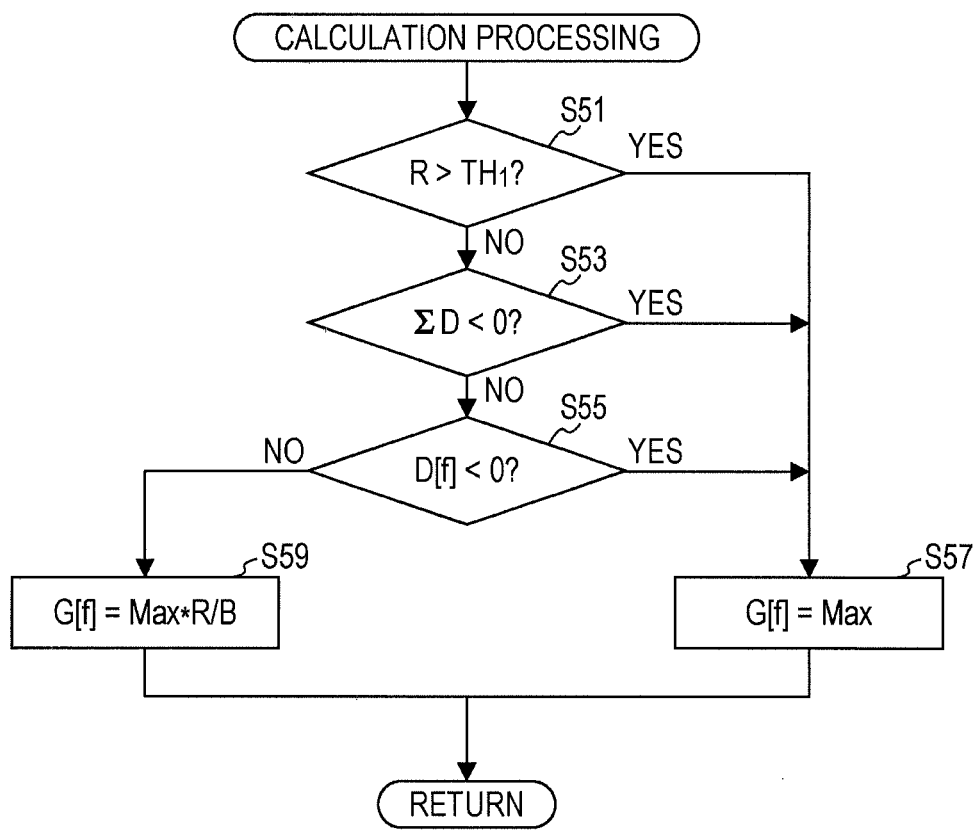
FIG. 14 illustrates a process flow of a calculating process.

First, the flow amount determining unit 1171 determines whether a buffer remainder R is greater than a predetermined threshold $TH_1$ (FIG. 14: operation S51). In operation S51, the buffer remainder R is calculated by subtracting the buffer utilization amount total EU from the buffer capacity B. "$TH_1$" is a predetermined threshold related to the buffer remainder. Hereinbelow, the buffer utilization amount of the flow f is "U[f]," the amount of change to the buffer utilization amount due to the flow f is "D[f]," and the inflow data amount per unit of time of the flow f to the shared buffer 1051 is "G[f]."

If the buffer remainder R is greater than the predetermined threshold TH1 (operation S51: Yes route), the flow amount determining unit 1171 sets the inflow data amount G[f] of the flow f as the maximum G[f] (operation S57). This is because there is still space available in the shared buffer 1051. Hereinbelow, the maximum represents a wire rate.

Conversely, if the buffer remainder R is not greater than the predetermined threshold $TH_1$ (operation S51: No route), the flow amount determining unit 1171 determines whether ΣD is less than zero (operation S53). That is, the flow amount determining unit 1171 determines whether the utilization amount of the shared buffer 1051 has decreased.

If ΣD is less than zero (operation S53: Yes route), the flow amount determining unit 1171 sets the inflow data amount G[f] of the flow f as the maximum G[f] (operation S57). Since the total utilization amount of the shared buffer 1051 exhibits a decreasing trend, the occurrence of a buffer overflow is unlikely even if the inflow data amount per unit of time to the shared buffer 1051 has increased.

Conversely, if the ΣD is not less than zero (operation S53: No route), the flow amount determining unit 1171 determines whether D[f] is less than zero (operation S55). That is, the flow amount determining unit 1171 determines whether the buffer utilization amount of the flow f is decreasing or not.

If D[f] is less than zero (operation S55: Yes route), the flow amount determining unit 1171 sets the inflow data amount G[f] of the flow f as the maximum G[f] (operation S57). Since the total utilization amount of the shared buffer 1051 exhibits a decreasing trend due to the flow f, the occurrence of a buffer overflow is unlikely even if the inflow data amount per unit of time of the flow f has increased. Then, the processing returns to the original processing.

Conversely, if D[f] is not less than zero (operation S55: No route), the flow amount determining unit 1171 sets the inflow data amount G[f] of the flow f as G[f]=Max*R/B (operation S59). That is, a smaller inflow data amount is assigned in correspondence with a smaller buffer remainder R. Then, the processing returns to the original processing.

The determination processing described above may be conducted only for a flow in which a change in the buffer utilization amount occurs, or for all the flows.

The control of the inflow data amount in the fifth embodiment will be explained using FIG. 15. In FIG. 15, a greater height of a hatched rectangle indicates that the buffer utilization amount is correspondingly larger. In the top part of FIG. 15, the present buffer utilization amount is indicated as greater than the past buffer utilization amount, and the bottom part of FIG. 15 indicates that the present buffer utilization amount is smaller than the past buffer utilization amount. For example, as illustrated in the top part of FIG. 15, when the buffer utilization amount increases, the subsequent buffer utilization amount increases, and so it may be considered that there is a high possibility that the future buffer utilization amount will be greater than the present buffer utilization amount. In this case, if the inflow data amount to the buffer is not reduced, there is a high risk that a buffer overflow may occur. Therefore, in the present embodiment, the inflow data amount G[f] is set to be smaller than the wire rate when the buffer utilization amount is increasing.

Conversely, as illustrated in the bottom part of FIG. 15, when the buffer utilization amount decreases, the subsequent buffer utilization amount decreases, and so it may be considered that there is a high possibility that the future buffer utilization amount will be smaller than the present buffer utilization amount. In this case, even if the inflow data amount to the buffer is increased, it will be unlikely that a buffer overflow will occur. Therefore, in the present embodiment, the inflow data amount G[f] is set to the wire rate when the buffer utilization amount is decreasing.

Returning to the explanation of FIG. 13, the flow amount determining unit 1171 then completes the processing when a processing end instruction is received (operation S45: Yes route). If the processing is not completed (operation S45: No route), the processing returns to operation S42 to continue the processing.

Processing to control the inflow of frames to match the inflow data amount calculated by the flow amount determining unit 1171 will be described next using FIGS. 16 and 17. An example of processing by the measuring unit 1251 will be described.

Figure 16:
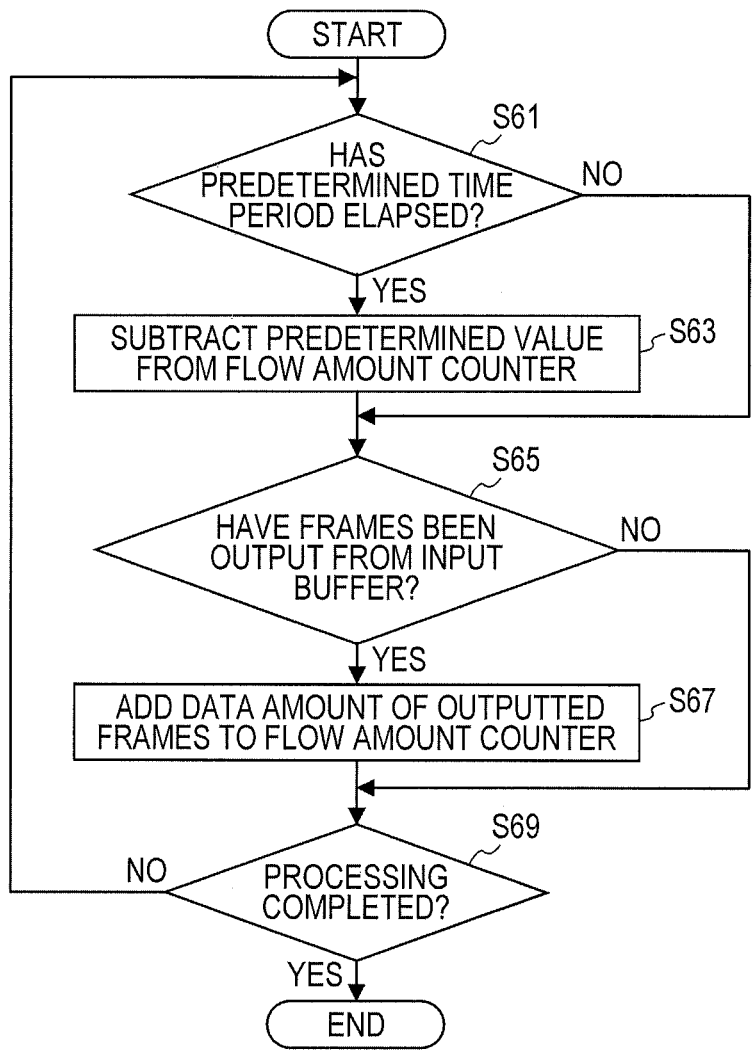
FIG. 16 illustrates a process flow of processes conducted by a measuring unit.

First, the measuring unit 1251 determines whether or not a predetermined time period to calculate the inflow data amount has elapsed (FIG. 16: operation S61).

If the predetermined time period to calculate the inflow data amount has not elapsed (operation S61: No route), the processing moves to operation S65. Conversely, if the predetermined time period to calculate the inflow data amount has elapsed (operation S61: Yes route), the measuring unit 1251 subtracts a predetermined value from a flow amount counter for each flow (operation S63).

The measuring unit 1251 then determines once again whether a frame has been output from the input buffer 1211 (operation S65). If no frame has been output from the input buffer 1211 (operation S65: No), the processing moves to operation S69. Conversely, if a frame has been output from the input buffer 1211 (operation S65: Yes route), the output frame data amount is added to the flow amount counter for the flow of the output frame (operation S67).

The measuring unit 1251 then completes the processing when a processing end instruction is received (operation S69: Yes route). If the processing is not completed (operation S69: No route), the processing returns to operation S61 to continue the processing.

As described above, the inflow data amount to the shared buffer 1051 is managed for each flow. Moreover, information about the flow amount counter values and frame transfer conditions is appropriately reported to the scheduling unit 1191 by the measuring unit 1251.

Figure 17:
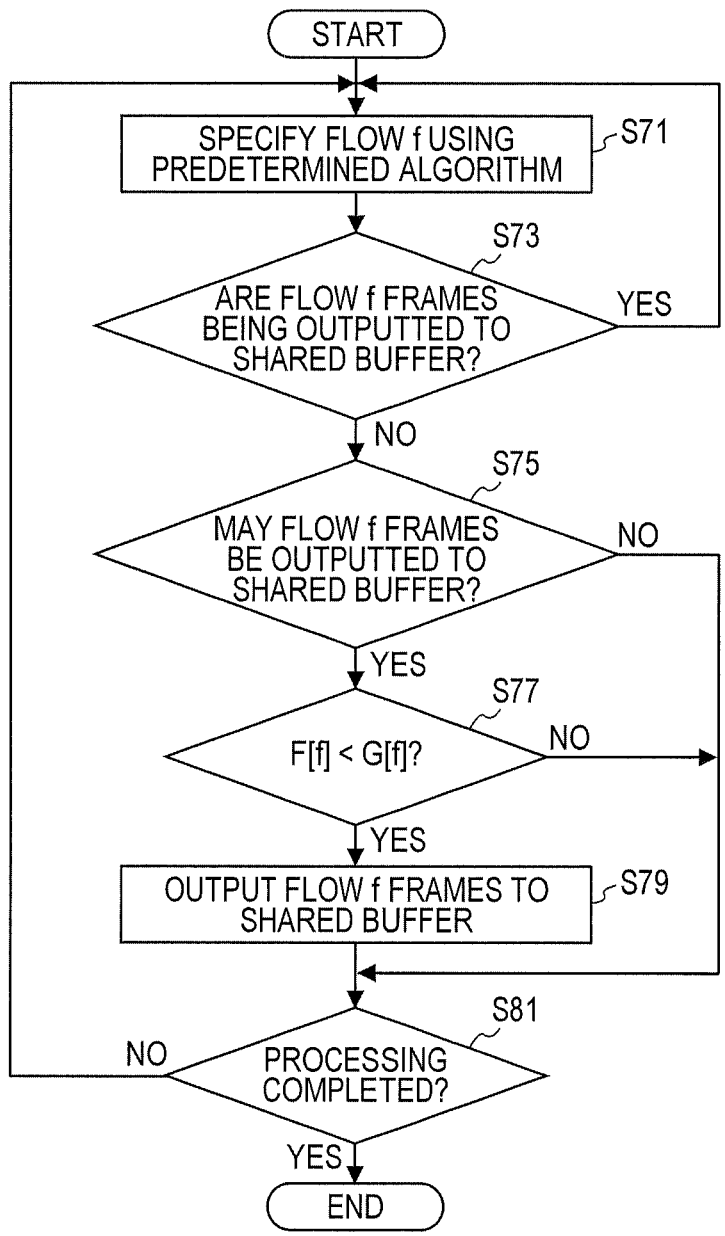
FIG. 17 illustrates a process flow of processes conducted by a scheduling unit.

The scheduling unit 1191 uses a predetermined algorithm (e.g., round robin) to specify a flow (here, the flow f) that outputs frames to the shared buffer 1051 (FIG. 17: operation S71).

The scheduling unit 1191 then determines whether the specified flow f frames are being output to the shared buffer 1051 (operation S73). If the flow f frames are being output to the shared buffer 1051 (operation S73: Yes route), the processing returns to operation S71 since no more flow f frames may be output to the shared buffer 1051.

Conversely, if the flow f frames are not being output to the shared buffer 1051 (operation S73: No route), it is determined that the flow f frames may be output to the shared buffer 1051 (operation S75). Whether or not there are any flow f frames waiting for output to the shared buffer 1051 is determined in operation S75.

If no flow f frames may be output to the shared buffer 1051 (operation S75: No route), the processing moves to operation S81. Conversely, if the flow f frames may be output to the shared buffer 1051 (operation S75: Yes route), the scheduling unit 1191 determines whether or not F[f] is less than G[f] (operation S77). "F[f]" is a flow amount counter value for the flow f measured by the measuring units 1251 and 1253. "G[f]" is the inflow data amount of the flow f calculated by the flow amount determining unit 1171.

If F[f] is not less than G[f] (operation S77: No route), the process moves to operation S81 since no frames may be output to the shared buffer 1051. Conversely, if F[f] is less than G[f] (operation S77: Yes route), the scheduling unit 1191 outputs the flow f frames to the shared buffer 1051 (operation S79).

The scheduling unit 1191 then completes the processing when a processing end instruction is received (operation S81: Yes route). If the processing is not completed (operation S81: No route), the processing returns to operation S71 to continue the processing.

By implementing the above processing, the inflow data amount per flow may be controlled so that a determined inflow data amount is not exceeded.

Processing conducted by the flow control units 1231 and 1233 will be described next with reference to FIG. 18. An example of processing by the flow control unit 1231 will be described.

Figure 18:
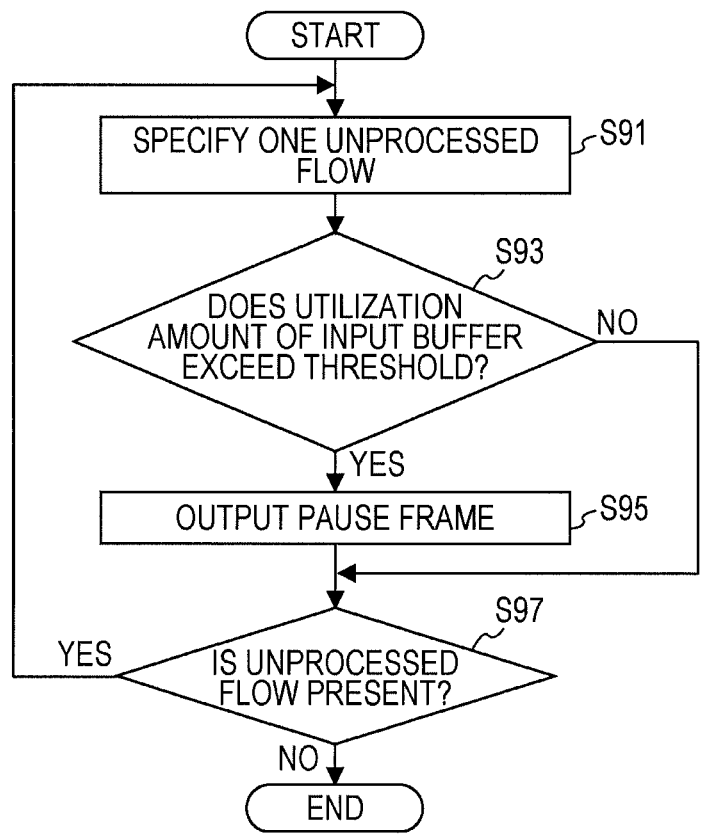
FIG. 18 illustrates a process flow of processes conducted by a flow control unit.

First the flow control unit 1231 specifies one unprocessed flow (FIG. 18: operation S91).

The flow control unit 1231 then calculates the utilization amount of the input buffer 1211 for the specified flow and determines whether the utilization amount exceeds a threshold (operation S93). Thresholds used in operation S93 are previously set for each flow.

If the utilization amount does not exceed the threshold (operation S93: No route), the processing moves to operation S97. Conversely, if the utilization amount exceeds the threshold (operation S93: Yes route), the flow control unit 1231 creates a pause frame to request the transmission source device of the flow to suspend transmission of the frames, and outputs the pause frame to the selecting unit 1071 (operation S95).

The flow control unit 1231 determiners if an unprocessed flows is present (operation S97). If an unprocessed flow is present (operation S97: Yes route), the processing returns to operation S91 to process the next flow. Conversely, if no unprocessed flow remains (operation S97: No route), the processing is completed.

If there are no unprocessed flows remaining, flows for which the processing is completed may be considered once again as unprocessed flows, and the processing may be repeated.

By implementing the above processing, the transmission of frames of the flow occupying the input buffer 1211 may be suspended.

In this way, in the present embodiment, an appropriate inflow data amount may be set in response to changes to the buffer utilization amount for each flow. As a result, the occurrence of overflows of the shared buffer 1051 may be suppressed and the excessive limitation of bandwidths may be suppressed. Moreover, since the frames are not discarded unlike the EPD, flows in which frame discarding is not desired (e.g., FCoE) may also be addressed. Furthermore, a shared buffer may be used effectively since the shared buffer is not divided for each port.

Moreover, in the present embodiment, the transmission of frames may be suspended in response to usage conditions of an input buffer provided separately from the shared buffer. As a result, changes in communication states may be handled with flexibility.

Sixth Embodiment

Figure 19:
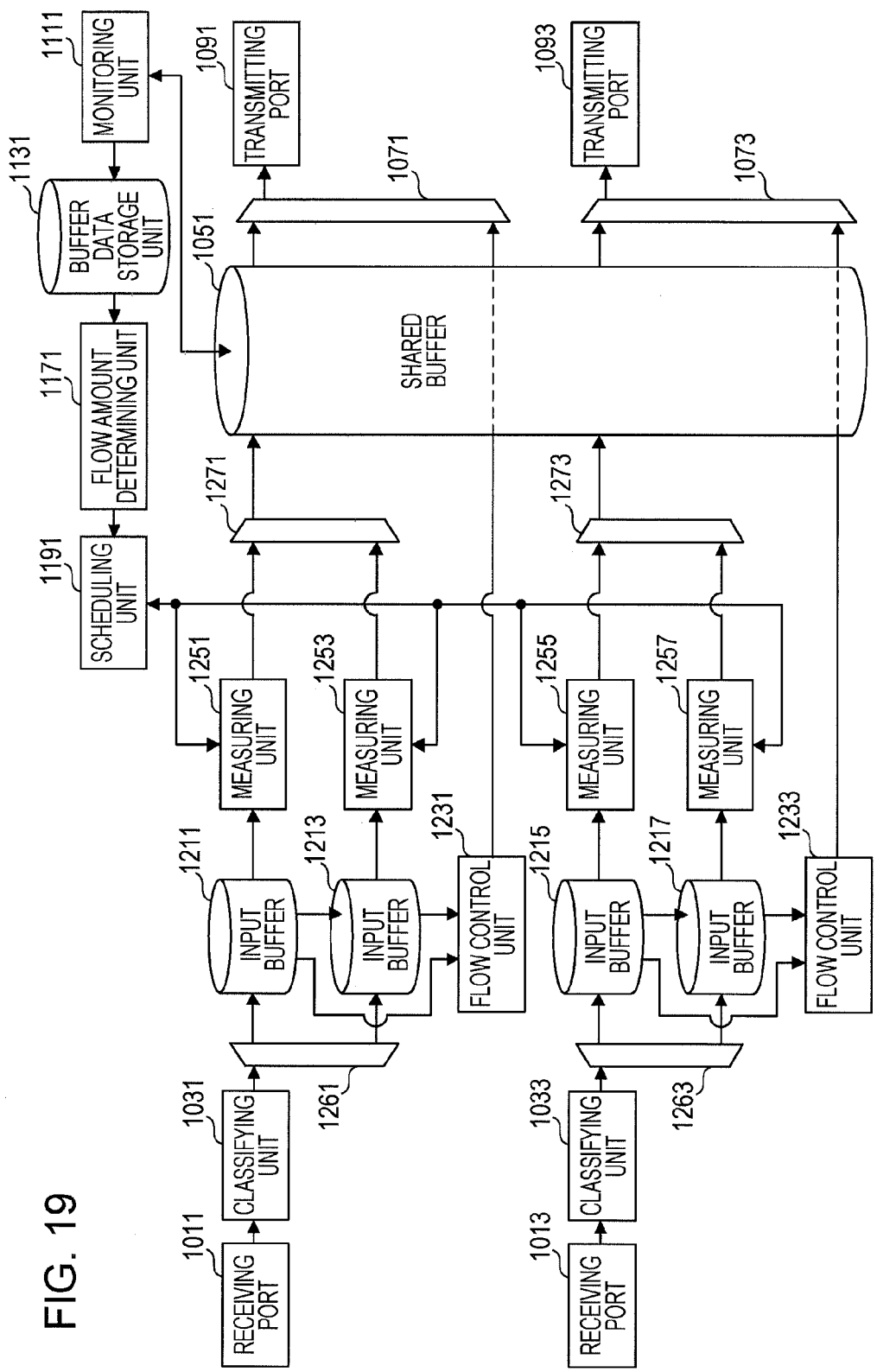
FIG. 19 is a functional block drawing of a relay device according to a sixth embodiment.

FIG. 19 is a functional block drawing of a relay device according to a sixth embodiment. The relay device of the sixth embodiment is, for example, a layer 2 switch. The relay device includes receiving ports 1011 and 1013, classifying units 1031 and 1033, distributing units 1261 and 1263, input buffers 1211, 1213, 1215, and 1217, flow control units 1231 and 1233, measuring units 1251, 1253, 1255, and 1257, selecting units 1271 and 1273, a shared buffer 1051, selecting units 1071 and 1073, transmitting ports 1091 and 1093, a monitoring unit 1111, a buffer data storage unit 1131, a flow amount determining unit 1171, and a scheduling unit 1191.

The receiving port 1011 outputs received frames to the classifying unit 1031. The classifying unit 1031 adds information for identifying the flow to the input frames and outputs the frames to the distributing unit 1261. The distributing unit 1261 stores the frames in the input buffer 1211 or the input buffer 1213 according to information for identifying the flow. The flow control unit 1231 determines whether or not to conduct flow control based on the utilization amount of the input buffers 1211 and 1213, and if it is determined that flow control is to be conducted, creates a pause frame and outputs the same to the selecting unit 1071. The measuring unit 1251 measures the frame data amount that flows into the shared buffer 1051 from the input buffer 1211 and outputs frames to the selecting unit 1271. The selecting unit 1071 outputs input frames to the transmitting port 1091. The transmitting port 1091 transmits input frames to a target device. The monitoring unit 1111 calculates a utilization amount of the shared buffer 1051 for each flow. The monitoring unit 1111 calculates a change amount of the utilization amount of the shared buffer 1051 and stores the change amount in the buffer data storage unit 1131. The flow amount determining unit 1171 calculates the frame data amount flowing into the shared buffer 1051 from the input buffers 1211 and 1213 per unit of time for each flow based on data stored in the buffer data storage unit 1131, and outputs the frame data amount to the scheduling unit 1191. The scheduling unit 1191 manages the order of the frames flowing into the shared buffer 1051 from the input buffers 1211 and 1213.

The function of the receiving port 1013 is similar to that of the receiving port 1011. The function of the classifying unit 1033 is similar to that of the classifying unit 1031. The functions of the input buffers 1213, 1215, and 1217 are similar to that of the input buffer 1211. The function of the flow control unit 1233 is similar to that of the flow control unit 1231. The functions of the measuring units 1253, 1255, and 1257 are similar to that of the measuring unit 1251. The function of the selecting unit 1273 is similar to that of the selecting unit 1271. The function of the transmitting port 1093 is similar to that of the transmitting port 1091.

The processing of the monitoring unit 1111 according to the present embodiment is similar to that explained in the fourth embodiment and so an explanation thereof will be omitted. The processing of the flow amount determining unit 1171, the scheduling unit 1191, the measuring unit 1251, and the flow control unit 1231 is the same as that explained with regard to the fifth embodiment and explanations thereof will be omitted.

The relay device of the present embodiment exhibits the same effects as the relay device of the fifth embodiment since this type of configuration is used. Moreover, an input buffer is provided for each flow in the present embodiment and one different measuring unit is associated with each input buffer. By adopting this type of configuration, the management of the inflow data amount for each flow is conducted easily and thus effective processing of the frames may be performed in the relay device.

Seventh Embodiment

Figure 20:
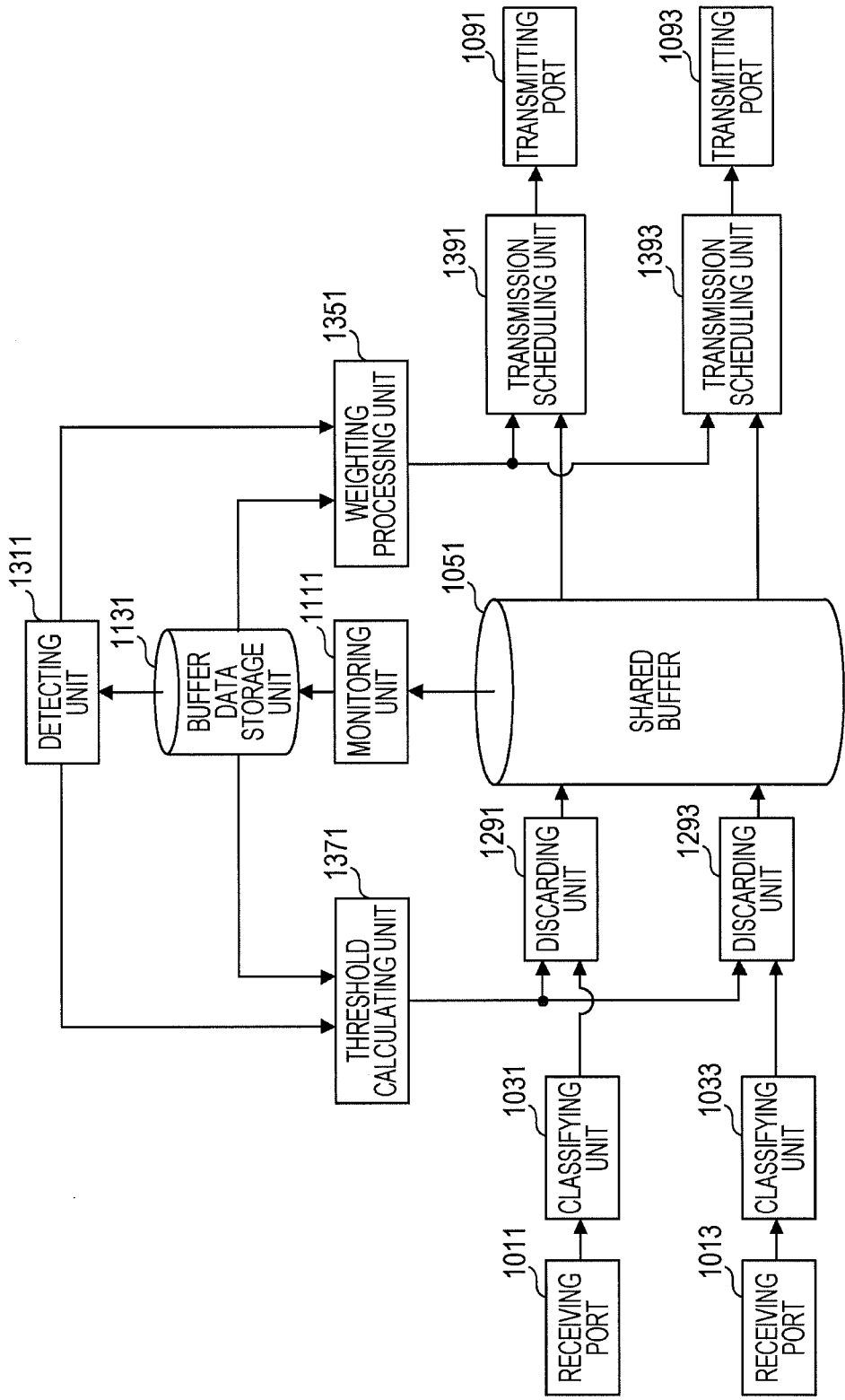
FIG. 20 is a functional block drawing of a relay device according to a seventh embodiment.

FIG. 20 is a functional block drawing of a relay device according to a seventh embodiment. The relay device of the seventh embodiment is, for example, a layer 2 switch. The relay device includes receiving ports 1011 and 1013, classifying units 1031 and 1033, discarding units 1291 and 1293, a shared buffer 1051, transmission scheduling units 1391 and 1393, transmitting ports 1091 and 1093, a monitoring unit 1111, a buffer data storage unit 1131, a detecting unit 1311, a weighting processing unit 1351, and a threshold calculating unit 1371.

The receiving port 1011 outputs received frames to the classifying unit 1031. The classifying unit 1031 adds information for identifying the flow to the input frames and outputs the frames to the discarding unit 1291. The discarding unit 1291 discards frames based on a threshold set for each flow, and stores un-discarded frames in the shared buffer 1051. The transmission scheduling unit 1391 determines a transmission order of the frames based on an input weighting value and a predetermined algorithm, and outputs the frames according to the determined transmission order to the transmitting port 1091. The transmitting port 1091 transmits input frames to a target device. The monitoring unit 1111 calculates a utilization amount of the shared buffer 1051 for each flow. The monitoring unit 1111 calculates the amount of change in the utilization amount of the shared buffer 1051 and stores the change amount in the buffer data storage unit 1131. The detecting unit 1311 uses data stored in the buffer data storage unit 1131 to detect whether the utilization amount of the shared buffer 1051 has changed. The detecting unit 1311 instructs the weighting processing unit 1351 and the threshold calculating unit 1371 to conduct processing when a change in the utilization amount of the shared buffer 1051 is detected. The weighting processing unit 1351 calculates, for each flow, the weighting value indicating a frame transmission priority level based on the data stored in the buffer data storage unit 1131, and outputs the weighting value to the transmission scheduling unit 1391. The threshold calculating unit 1371 calculates, for each flow, a threshold of the utilization amount of the shared buffer 1051 based on the data stored in the buffer data storage unit 1131, and outputs the threshold to the discarding units 1291 and 1293.

The function of the receiving port 1013 is similar to that of the receiving port 1011. The function of the classifying unit 1033 is similar to that of the classifying unit 1031. The function of the discarding unit 1293 is similar to that of the discarding unit 1291. The function of the transmission scheduling unit 1393 is similar to that of the transmission scheduling unit 1391. The function of the transmitting port 1093 is similar to that of the transmitting port 1091.

The operations of the relay device described in FIG. 20 will be explained hereinbelow. The processing by the monitoring unit 1111 is similar to the processing explained with regard to the fourth embodiment and will be omitted. In the seventh embodiment, data such as that illustrated in FIG. 21 is stored in a utilization amount table in the buffer data storage unit 1131. In the example of FIG. 21, an amount of change in the utilization amount and a utilization amount at each point in time are stored for each flow. Data that indicates whether or not the EPD is enabled is stored in an EPD column. A flow with the data in the EPD column set to "ON" is a flow subject to discarding by the discarding units 1291 and 1293. A flow with the data in the EPD column set to "OFF" is a flow not subject to discarding by the discarding units 1291 and 1293.

Figure 22:
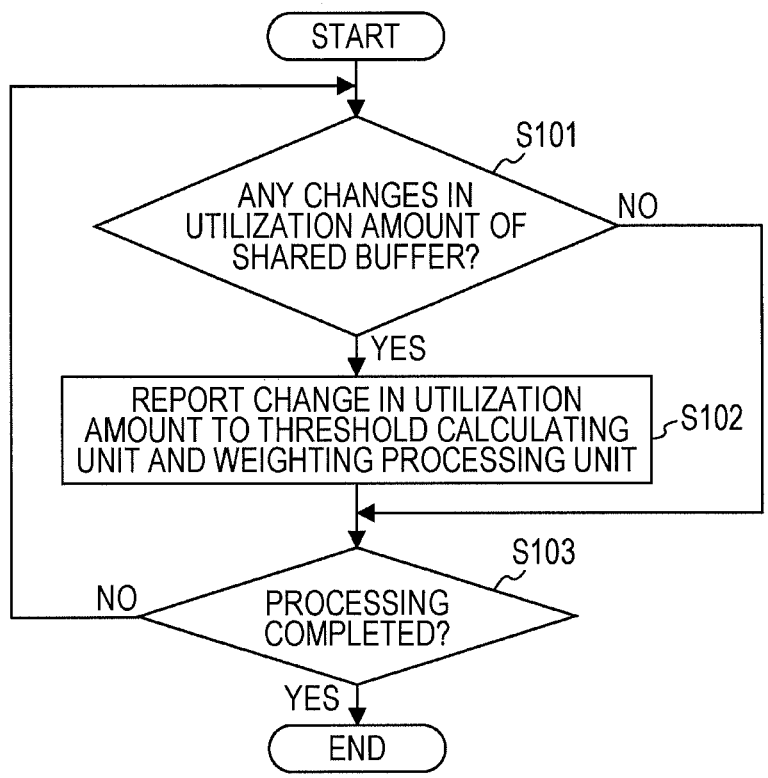
FIG. 22 illustrates a process flow of processes conducted by a detecting unit.

First, processing conducted by the detecting unit 1311 will be explained using FIG. 22. First, the detecting unit 1311 uses the utilization amounts calculated in operations S3 and S5 or the amounts of change in the utilization amount calculated in operations S9 and S11 to determine whether the utilization amount of the shared buffer 1051 has changed or not (FIG. 22: operation S101). For example, the utilization amount is considered to have changed if the change in the utilization amount exceeds a previously set threshold. If the utilization amount of the shared buffer 1051 has not changed (operation S101: No route), the processing moves to operation S103.

Conversely, if the utilization amount of the shared buffer 1051 has changed (operation S101: Yes route), the detecting unit 1311 reports that there has been a change in the utilization amount of the shared buffer 1051 to the weighting processing unit 1351 and the threshold calculating unit 1371 (operation S102).

The detecting unit 1311 then completes the processing when a processing end instruction is received (operation S103: Yes route). If the processing is not completed (operation S103: No route), the processing returns to operation S101 to continue the processing.

Processing conducted by the weighting processing unit 1351 and the threshold calculating unit 1371 will be explained with reference to FIGS. 23A and 23B.

Figure 23A:
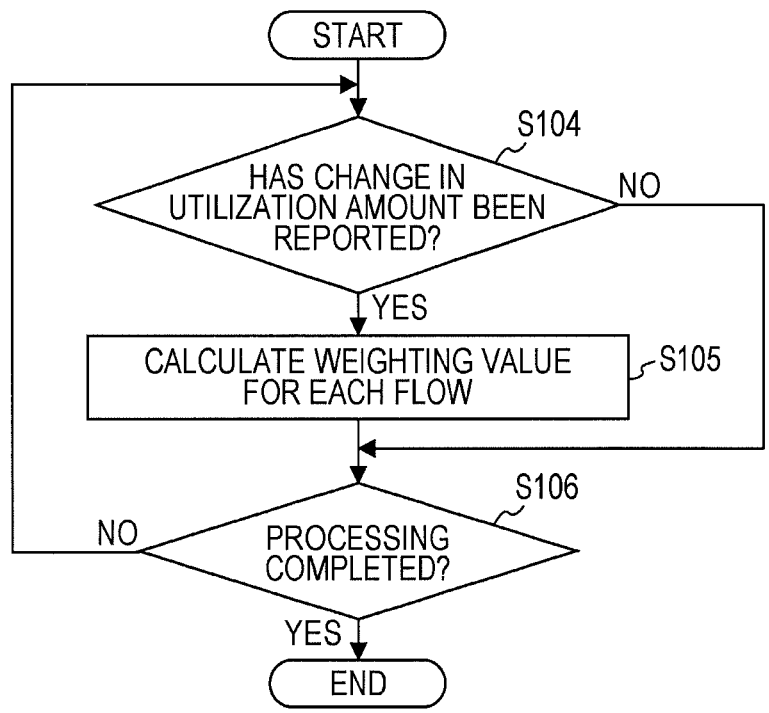
FIG. 23A illustrates a process flow of processes conducted by a weighting processing unit.

First, the weighting processing unit 1351 determines whether or not a change in the utilization amount of the shared buffer 1051 has been reported by the detecting unit 1311 (FIG. 23A: operation S104). If a change in the utilization amount of the shared buffer 1051 has not been reported by the detecting unit 1311 (operation S104: No route), the processing moves to operation S106.

Conversely, if a change in the utilization amount of the shared buffer 1051 has been reported (operation S104: Yes route), the weighting processing unit 1351 uses the utilization amount table stored in the buffer data storage unit 1131 to calculate a weighting value for each flow (operation S105). The weighting processing unit 1351 then outputs the calculated weighting value to the transmission scheduling units 1391 and 1393. For example, the weighting processing unit 1351 calculates the weighting value for each flow so that a correspondingly large weighting value is assigned as the utilization amount of the shared buffer 1051 increases, and a correspondingly small weighting value is assigned as the utilization amount of the shared buffer 1051 decreases. By calculating the weighting value in this way, frames of flows that have a high possibility of occupying the shared buffer 1051 are preferentially transmitted.

The weighting processing unit 1351 then completes the processing when a processing end instruction is received (operation S106: Yes route). If the processing is not completed (operation S106: No route), the processing returns to operation S104 to continue the processing.

Figure 23B:
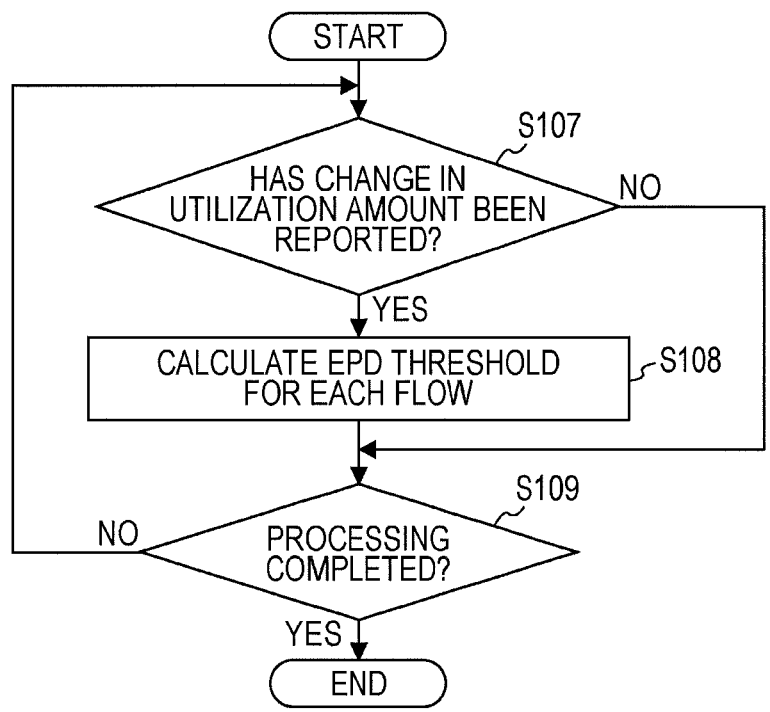
FIG. 23B illustrates a process flow of processes conducted by a threshold calculating unit.

On the other hand, the threshold calculating unit 1371 determines whether or not a change in the utilization amount of the shared buffer 1051 has been reported by the detecting unit 1311 (FIG. 23B: operation S107). If a change in the utilization amount of the shared buffer 1051 has not been reported by the detecting unit 1311 (operation S107: No route), the processing moves to operation S109.

Conversely, if a change in the utilization amount of the shared buffer 1051 has been reported by the detecting unit 1311 (operation S107: Yes route), the threshold calculating unit 1371 uses the utilization amount table stored in the buffer data storage unit 1131 to calculate a threshold (EPD threshold) for the utilization amount of the shared buffer 1051 for each flow, and outputs the thresholds to the discarding units 1291 and 1293 (operation S108).

The threshold calculating unit 1371 then completes the processing when a processing end instruction is received (operation S109: Yes route). If the processing is not completed (operation S109: No route), the processing returns to operation S107 to continue the processing.

The threshold is calculated in operation S108 as described below, for example. First, the threshold calculating unit 1371 calculates a threshold maximum value Ted_Max and a minimum value Ted_Min at a point in time t using the following equations.

$$Ted\_Min = CBmax/(NCBact+1) \quad Ted\_Max = CBmax/NCBact$$

Here, CBMax is the capacity of the shared buffer 1051, and NCBact is the number of flows that use the shared buffer 1051 at the point in time t.

Ted(f)tmp is defined below.

$$Ted(f)tmp = Ted(f) - (Ted(f) \times \Delta PCB(f))$$

Here, Ted(f) is a threshold of the flow f at the point in time t, and $\Delta PCB(f)$ is the amount of change in the utilization rate PCB(f) of the shared buffer 1051 for the flow (f).

The threshold calculating unit 1371 then calculates a threshold Ted(f)next of the flow f at a point in time subsequent to the point in time t using the following equation.

$$Ted(f)next = \max(Ted\_min, \min(Ted\_max, Ted(f)tmp))$$

Here, max(a,b) is an equation to find the largest of a and b, and min(a,b) is an equation to find the smallest of a and b.

However, if $\Delta PCB(f)$ is negative and Ted(f)next is less than Ted(f), Ted(f)next shall be made equal to Ted(f).

For example, when data is stored in the utilization amount table as illustrated in FIG. 21, the data will be as indicated in FIG. 24 when Ted_Min and Ted_Max are calculated. FIG. 24 illustrates Ted Min and Ted_Max values for each point in time from $t_0$ to $t_3$. As illustrated in FIG. 24, as the number of flows using the shared buffer 1051 increase, Ted_Min and Ted_Max become smaller. Herein, CBmax equals 5000.

When data is stored in the utilization amount table as illustrated in FIG. 21, the data will be as indicated in FIG. 25 when the threshold for each flow is calculated. FIG. 25 illustrates threshold of each flow for each point in time from $t_0$ to $t_3$. The arrows in FIG. 25 indicate that the value is the same as the value at the preceding point in time. The EPD is not enabled for the flow 2 so the threshold is not calculated. The initial value of the threshold is set to 3000.

In this way, in the present embodiment, the threshold may be set automatically according to a change in the utilization amount of the shared buffer 1051. For example as illustrated in the top part of FIG. 15, a threshold is set to be smaller than a previously set value to avoid the occupation of the buffer by a flow that is causing the buffer utilization amount to increase. Conversely, for example as illustrated in the bottom part of FIG. 15, a threshold is set to be larger than or the same as a previously set value since there is a fear that communication quality may deteriorate if the threshold is reduced for a flow that is causing the buffer utilization amount to decrease.

Figure 26:
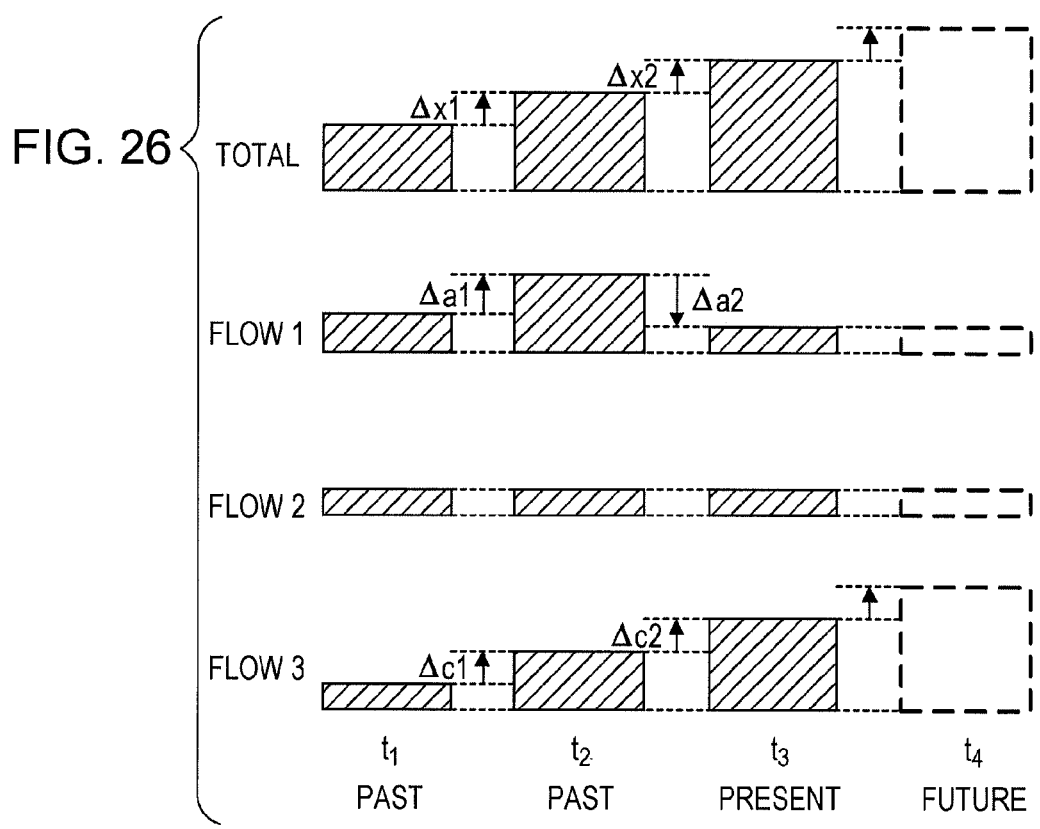
FIG. 26 describes the relationship between changes in the buffer utilization amount and calculating a threshold.

Moreover, the calculation methods described above consider not only a change in the buffer utilization amount for each flow, but also a change in the total buffer utilization amount. For example, as illustrated in FIG. 26, the total buffer utilization amount is increasing, the buffer utilization amount is decreasing due to flow 1, the buffer utilization amount does not change due to flow 2, and the buffer utilization amount is increasing due to flow 3. In this case, the thresholds for the flow 1 and the flow 2 are set to be the same or larger than the existing set values since the percentage with regard to the total buffer utilization amount of the buffer utilization amount is decreasing due to these flows. On the other hand, the threshold for the flow 3 is set to be smaller than the existing set value since the percentage with regard to the total buffer utilization amount of the buffer utilization amount is increasing due to the flow 3.

By implementing the abovementioned processing, the calculation of thresholds for discarding frames and determining the frame transmission order may be appropriately conducted for each flow according to changes in the utilization amount of the shared buffer 1051.

Next, processing conducted by the transmission scheduling units 1391 and 1393 that receive the weighting value from the weighting processing unit 1351 will be described with reference to FIG. 27. Herein, an explanation using an example of processing conducted by the transmission scheduling unit 1391 will be described.

Figure 27:
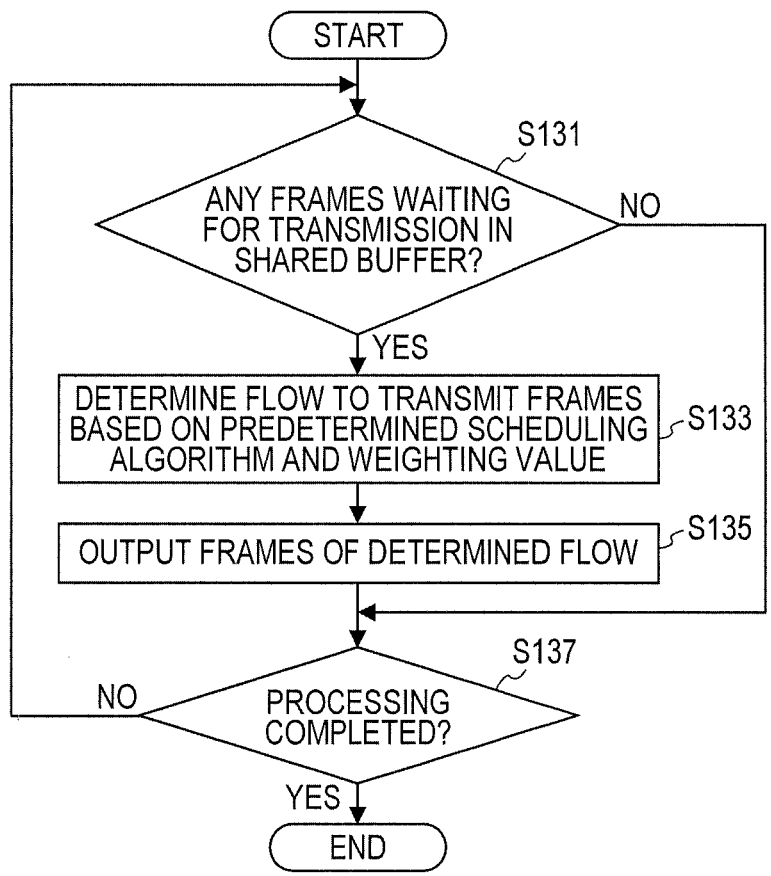
FIG. 27 illustrates a process flow of processes conducted by a transmission scheduling unit.

First, the transmission scheduling unit 1391 determines whether there are any frames waiting to be transmitted in the shared buffer 1051 (FIG. 27: operation S131). If there is no frame is waiting to be transmitted in the shared buffer 1051 (operation S131: No route), the processing moves to operation S137.

Conversely, if there is a frame waiting to be transmitted in the shared buffer 1051 (operation S131: Yes route), the transmission scheduling unit 1391 specifies the flow transmitting the frame based on a predetermined scheduling algorithm and the weighting value (operation S133). For example, the flow transmission order is determined by adding the weighting value to a numerical value indicating a transmission order determined by the predetermined scheduling algorithm. Round robin, for example, may be used as the scheduling algorithm.

The transmission scheduling unit 1391 then outputs the frames of the determined flow to the transmitting port 1091 (operation S135).

The transmission scheduling unit 1391 then completes the processing when a processing end instruction is received (operation S137: Yes route). If the processing is not completed (operation S137: No route), the processing returns to operation S131 to continue the processing.

By implementing the processing described above, the outputting of frames from the shared buffer 1051 may be conducted in response to changes to the buffer utilization amount for each flow.

Next, processing conducted by the discarding units 1291 and 1293 will be explained with reference to FIG. 28. Herein, an explanation using an example of processing conducted by the discarding unit 1291 will be described.

Figure 28:
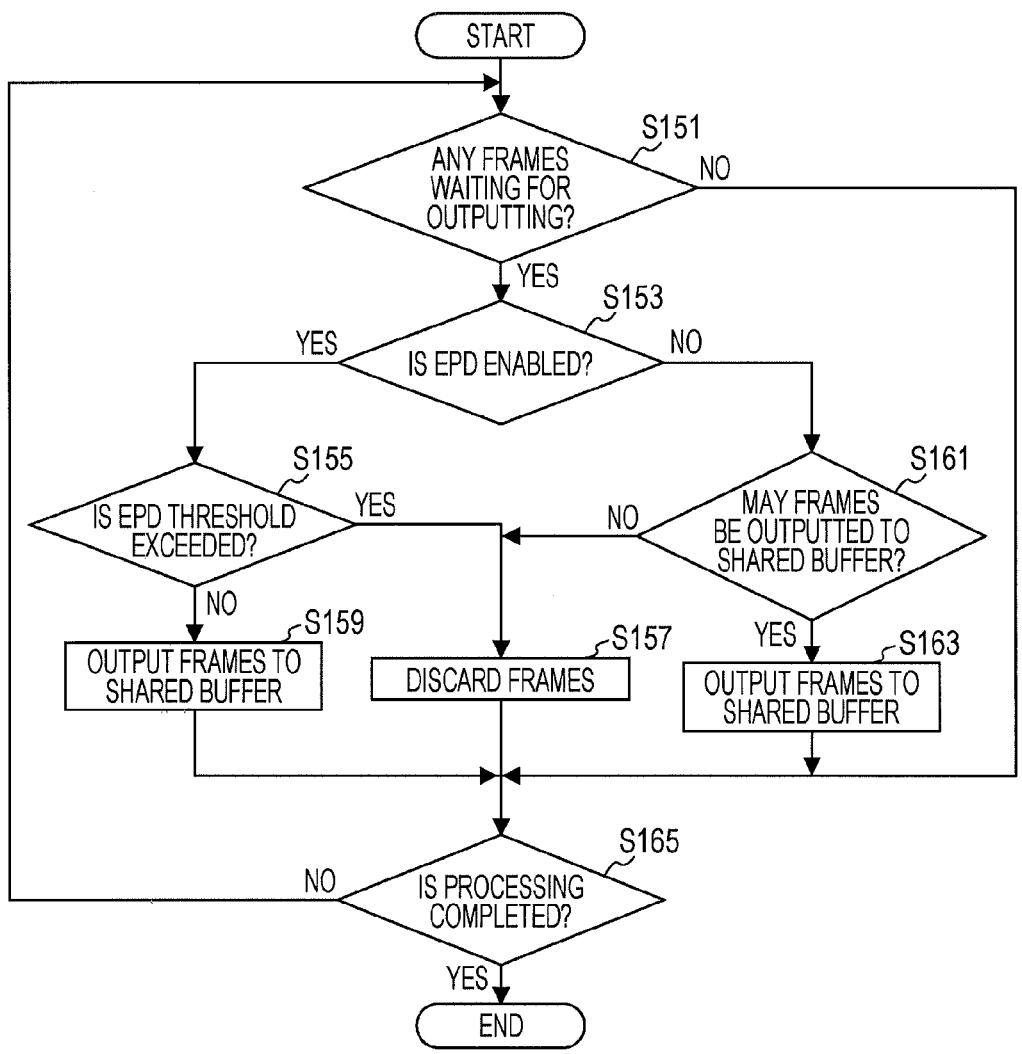
FIG. 28 illustrates a process flow of processes conducted by a discarding unit.

First, the discarding unit 1291 determines whether or not there are any frames waiting to be output to the shared buffer 1051 (FIG. 28: operation S151). If there is no frame waiting to be output (operation S151: No route), the processing moves to operation S165. Conversely, if there are frames waiting to be output (operation S151: Yes route), the discarding unit 1291 determines whether the EPD is enabled for the flow of the frames waiting to be output (operation S153). For example, a table (not illustrated) in which data indicating whether or not the EPD is enabled is registered is used for the determination in operation S153.

If the EPD is enabled (operation S153: Yes route), the discarding unit 1291 determines whether the utilization amount of the shared buffer 1051 exceeds the threshold due to a frame of the flow that matches the flow of the waiting frames when the threshold is set for that flow (operation S155).

If the set threshold is exceeded (operation S155: Yes route), the discarding unit 1291 discards the frames since there is a high possibility that the shared buffer 1051 will overflow if the frames are stored in the shared buffer 1051 (operation S157). Then the processing moves to operation S165. If the set threshold is not exceeded (operation S155: No route), the discarding unit 1291 outputs the frames to the shared buffer 1051 since there is no problem in storing the frames in the shared buffer 1051 (operation S159). Then the processing moves to operation S165.

Conversely, if the EPD is not enabled in operation S153 (operation S153: No route), the discarding unit 1291 determines that the frames waiting to be output may be output to the shared buffer 1051 (operation S161). In operation S161 it is determined whether or not the shared buffer 1051 will overflow if the frames are output to the shared buffer 1051.

If no frames may be output to the shared buffer 1051 (operation S161: No route), the discarding unit 1291 discards the frames (operation S157). Conversely, if the frames may be output to the shared buffer 1051 (operation S161: Yes route), the discarding unit 1291 outputs the frames to the shared buffer 1051 (operation S163). Then the processing moves to operation S165.

The discarding unit 1291 then completes the processing when a processing end instruction is received (operation S165: Yes route). If the processing is not completed (operation S165: No route), the processing returns to operation S151 to continue the processing.

As described above, the frames may be discarded based on a threshold set in correspondence with a change in the utilization amount of the shared buffer.

In this way in the present embodiment, frame discarding due to EPD is suppressed and the overflow of the shared buffer 1051 is also suppressed since a threshold corresponding to a change in the utilization amount of the shared buffer 1051 is set. Therefore, the present embodiment is especially effective for flows in which a predetermined amount of frame discarding is allowed. Furthermore, the shared buffer 1051 may be used effectively since the shared buffer 1051 is not divided for each port.

Eighth Embodiment

Figure 29:
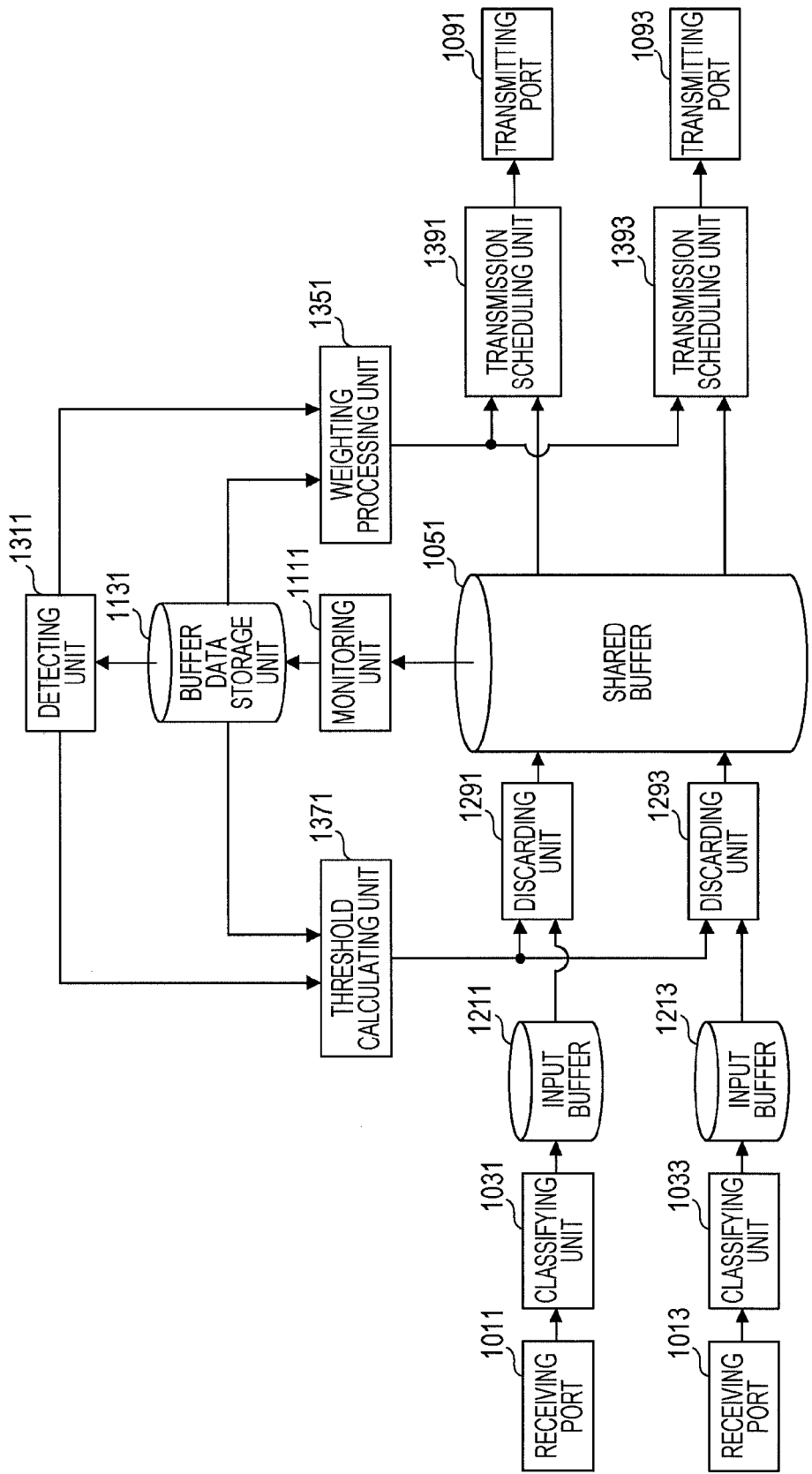
FIG. 29 is a functional block drawing of a relay device according to an eighth embodiment.

FIG. 29 is a functional block drawing of a relay device according to an eighth embodiment. The relay device of the eighth embodiment is, for example, a layer 2 switch. The relay device includes receiving ports 1011 and 1013, classifying units 1031 and 1033, input buffers 1211 and 1213, discarding units 1291 and 1293, a shared buffer 1051, transmission scheduling units 1391 and 1393, transmitting ports 1091 and 1093, a monitoring unit 1111, a buffer data storage unit 1131, a detecting unit 1311, a weighting processing unit 1351, and a threshold calculating unit 1371.

The receiving port 1011 outputs received frames to the classifying unit 1031. The classifying unit 1031 adds information for identifying the flow to the input frames and stores the frames in the input buffer 1211. The discarding unit 1291 discards frames based on a threshold set for each flow, and stores un-discarded frames in the shared buffer 1051. The transmission scheduling unit 1391 determines a transmission order of the frames based on an input weighting value and a predetermined algorithm, and outputs the frames according to the determined transmission order to the transmitting port 1091. The transmitting port 1091 transmits input frames to a target device. The monitoring unit 1111 calculates a utilization amount of the shared buffer 1051 for each flow. The monitoring unit 1111 calculates a change amount of the utilization amount of the shared buffer 1051 and stores the change amount in the buffer data storage unit 1131. The detecting unit 1311 uses data stored in the buffer data storage unit 1131 to detect whether the utilization amount of the shared buffer 1051 has changed. The detecting unit 1311 then instructs the weighting processing unit 1351 and the threshold calculating unit 1371 to conduct processing when a change in the utilization amount of the shared buffer 1051 is detected. The weighting processing unit 1351 calculates, for each flow, the weighting value indicating a frame transmission priority level based on the data stored in the buffer data storage unit 1131, and outputs the weighting value to the transmission scheduling unit 1391. The threshold calculating unit 1371 calculates for each flow a threshold of the utilization amount of the shared buffer 1051 based on the data stored in the buffer data storage unit 1131, and outputs the threshold to the discarding units 1291 and 1293.

The function of the receiving port 1013 is similar to that of the receiving port 1011. The function of the classifying unit 1033 is similar to that of the classifying unit 1031. The function of the input buffer 1213 is similar to that of the input buffer 1211. The function of the discarding unit 1293 is similar to that of the discarding unit 1291. The function of the transmission scheduling unit 1393 is similar to that of the transmission scheduling unit 1391. The function of the transmitting port 1093 is similar to that of the transmitting port 1091.

The operations of the relay device described in FIG. 29 will be explained hereinbelow. The processing by the monitoring unit 1111 is the same as that explained in the fourth embodiment and will be omitted. The processing of the detecting unit 1311 and the weighting processing unit 1351 is the same as that explained with regard to the seventh embodiment and an explanation thereof will be omitted.

Next, processing conducted by the discarding units 1291 and 1293 will be explained with reference to FIG. 30. Herein, an explanation using an example of processing conducted by the discarding unit 1291 will be described.

Figure 30:
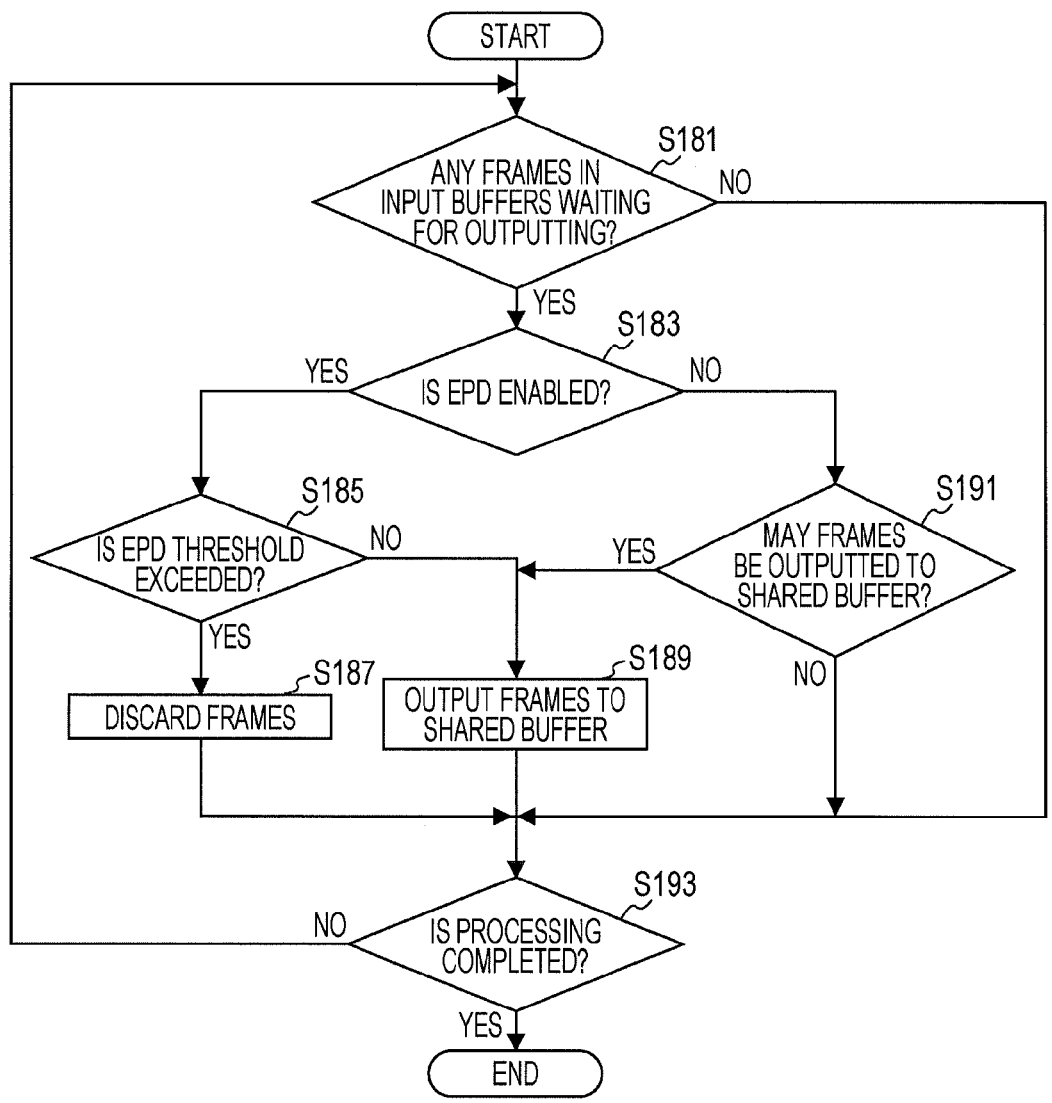
FIG. 30 illustrates a process flow of processes conducted by a discarding unit.

First, the discarding unit 1291 determines whether or not there are any frames waiting to be output to the shared buffer 1051 (FIG. 30: operation S181). If there are no frames waiting to be output (operation S181: No route), the processing moves to operation S193. Conversely, if there are frames waiting to be output (operation S181: Yes route), the discarding unit 1291 determines whether the EPD is enabled for the flow of the frames waiting to be output (operation S183). For example, a table (not illustrated) in which data indicating whether or not the EPD is enabled is registered is used for the determination in operation S183.

If the EPD is enabled (operation S183: Yes route), the discarding unit 1291 determines whether the utilization amount of the shared buffer 1051 exceeds the threshold due to a frame of the flow that matches the flow of the waiting frames when the threshold is set for that flow (operation S185).

If the set threshold is exceeded (operation S185: Yes route), the discarding unit 1291 discards the frames since there is a high possibility that the shared buffer 1051 will overflow if the frames are stored in the shared buffer 1051 (operation S87). Then the processing moves to operation S193. If the set threshold is not exceeded (operation S185: No route), the discarding unit 1291 outputs the frames to the shared buffer 1051 since there is no problem in storing the frames in the shared buffer 1051 (operation S189). Then the processing moves to operation S193.

Conversely, if the EPD is not enabled in operation S183 (operation S183: No route), the discarding unit 1291 determines that the frames waiting to be output may be output to the shared buffer 1051 (operation S191). In operation S191 it is determined whether or not the shared buffer 1051 will overflow if the frames are output to the shared buffer 1051.

If no frames may be output to the shared buffer 1051 (operation S191: No route), the discarding unit 1291 allows the frames to stay stored in the input buffer 1211, and the processing moves to operation S193.

Conversely, if the frames may be output to the shared buffer 1051 (operation S191: Yes route), the discarding unit 1291 outputs the frames to the shared buffer 1051 (operation S189). Then the processing moves to operation 5193.

The discarding unit 1291 then completes the processing when a processing end instruction is received (operation S193: Yes route). If the processing is not completed (operation S193: No route), the processing returns to operation S181 to continue the processing.

As described above, the frames may be discarded based on a threshold set in correspondence with a change in the utilization amount of the shared buffer. Moreover, if the frames of a flow in which the EPD is not enabled are not output to the shared buffer, the frames may be made to wait in an input buffer so that frame discarding may be suppressed.

The relay device of the present embodiment exhibits the same effects as the relay device of the seventh embodiment since this type of configuration is used.

Ninth Embodiment

Figure 31:
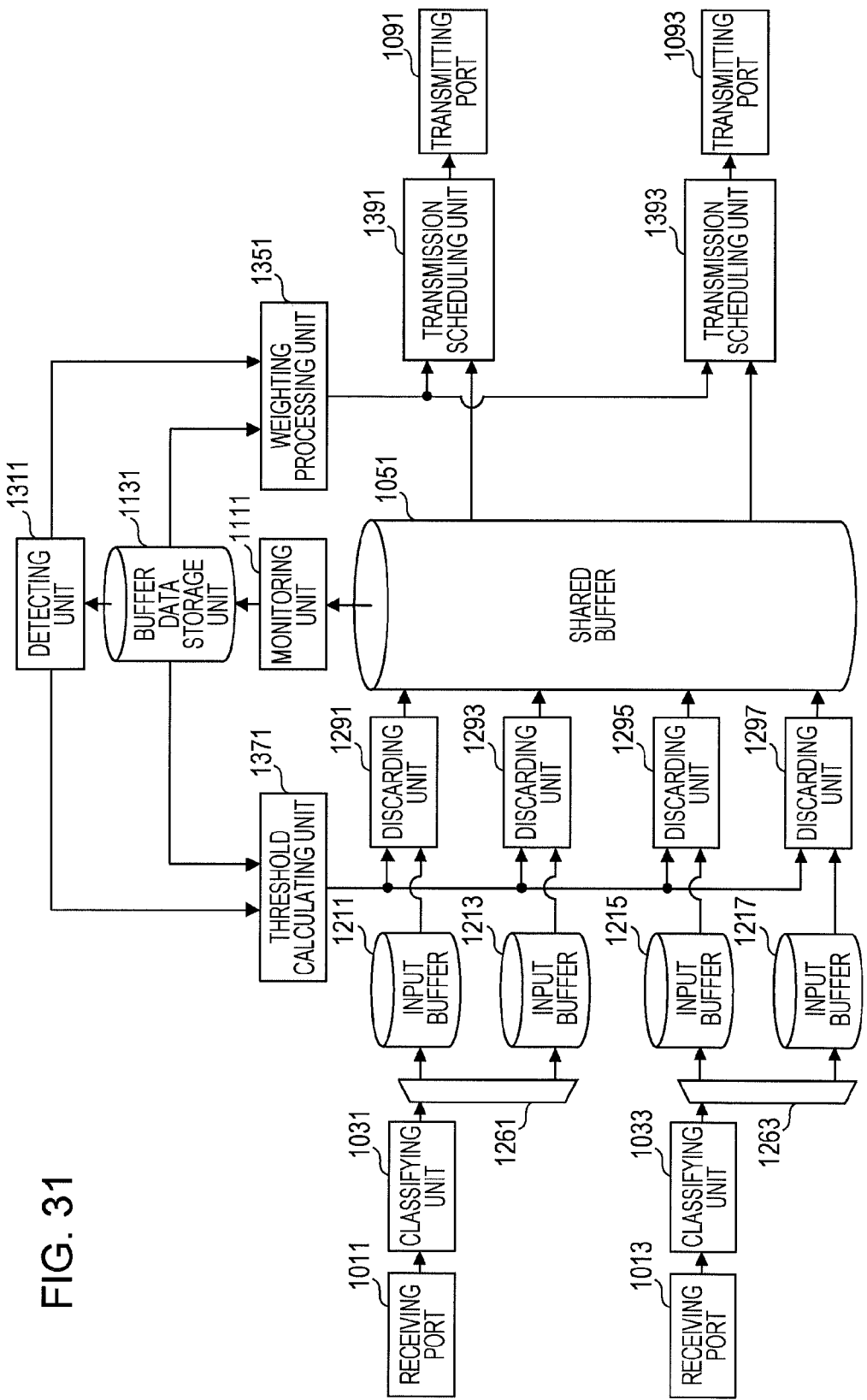
FIG. 31 is a functional block drawing of a relay device according to a ninth embodiment.

FIG. 31 is a functional block drawing of a relay device according to a ninth embodiment. The, relay device of the ninth embodiment is, for example, a layer 2 switch. The relay device includes receiving ports 1011 and 1013, classifying units 1031 and 1033, distributing units 1261 and 1263, input buffers 1211, 1213, 1215, and 1217, discarding units 1291, 1293, 1295, and 1297, a shared buffer 1051, transmission scheduling units 1391 and 1393, transmitting ports 1091 and 1093, a monitoring unit 1111, a buffer data storage unit 1131, a detecting unit 1311, a weighting processing unit 1351, and a threshold calculating unit 1371.

The receiving port 1011 outputs received frames to the classifying unit 1031. The classifying unit 1031 adds information for identifying the flow to the input frames and outputs the frames to the distributing unit 1261. The distributing unit 1261 stores the frames in input buffer 1211 or input buffer 1213 according to information for identifying the flow. The discarding unit 1291 discards frames based on a threshold set for each flow, and stores un-discarded frames in the shared buffer 1051. The transmission scheduling unit 1391 determines a transmission order of the frames based on an input weighting value and a predetermined algorithm, and outputs the frames according to the determined transmission order to the transmitting port 1091. The transmitting port 1091 transmits input frames to a target device. The monitoring unit 1111 calculates a utilization amount of the shared buffer 1051 for each flow. The monitoring unit 1111 calculates a change amount of the utilization amount of the shared buffer 1051 and stores the change amount in the buffer data storage unit 1131. The detecting unit 1311 uses data stored in the buffer data storage unit 1131 to detect whether the utilization amount of the shared buffer 1051 has changed. The detecting unit 1311 then instructs the weighting processing unit 1351 and the threshold calculating unit 1371 to conduct processing when a change in the utilization amount of the shared buffer 1051 is detected. The weighting processing unit 1351 calculates, for each flow, the weighting value indicating a frame transmission priority level based on the data stored in the buffer data storage unit 1131, and outputs the weighting value to the transmission scheduling unit 1391. The threshold calculating unit 1371 calculates for each flow a threshold of the utilization amount of the shared buffer 1051 based on the data stored in the buffer data storage unit 1131, and outputs the threshold to the discarding units 1291 to 1297.

The function of the receiving port 1013 is similar to that of the receiving port 1011. The function of the classifying unit 1033 is similar to that of the classifying unit 1031. The function of the distributing unit 1263 is similar to that of the distributing unit 1261. The functions of the input buffers 1213 to 1217 are similar to that of the input buffer 1211. The functions of the discarding units 1293 to 1297 are similar to that of the discarding unit 1291. The function of the transmission scheduling unit 1393 is similar to that of the transmission scheduling unit 1391. The function of the transmitting port 1093 is similar to that of the transmitting port 1091.

The processing of the monitoring unit 1111 according to the present embodiment is similar to that explained in the fourth embodiment and so an explanation thereof will be omitted. The processing of the detecting unit 1311 and the weighting processing unit 1351 is similar to the processing of the same explained with regard to the seventh embodiment and explanations thereof will be omitted. The processing of the discarding units 1291 to 1293 is the same as that explained with regard to the eighth embodiment and explanations thereof will be omitted.

The relay device of the present embodiment exhibits the same effects as the relay device of the eighth embodiment since this type of configuration is used. Moreover, an input buffer is provided for each flow in the present embodiment and one different discarding unit is associated with each input buffer. By using this type of configuration, the discarding of frames for each flow is conducted easily and thus effective processing of the frames may be performed in the relay device.

Figure 32:
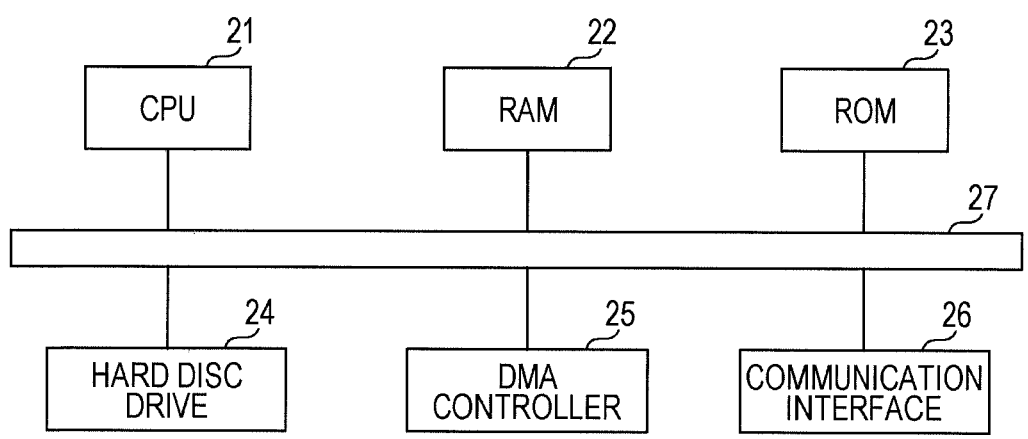
FIG. 32 is a hardware diagram of an embodiment of the relay device.

FIG. 32 is a hardware diagram of an embodiment of the relay device. The relay device has a CPU 21, a RAM 22, a ROM 23, a hard disc drive 24, a DMA controller 25, and a communication interface 26 all of which are interconnected via an internal bus 27. The CPU 21 executes programs stored in the RAM 22, the ROM 23, and the hard disc drive 24 and the like. Programs may be manufactured to cause a computer (processor) to conduct processing according to the above methods. The programs are not limited to the above storage media and may be stored in a computer-readable storage medium or a storage device such as, for example, a flexible disk, a CD-ROM, an optical magnetic disc, a semiconductor memory, a hard disc and the like. Intermediate processing results are temporarily stored in a storage device such as a main memory.

Although an embodiment of the abovementioned technology has been described, the present technology is not limited as such. For example, the functional block diagrams of the relay device described above may not correspond to the actual program module configuration.

The configurations of the tables described above are merely examples, and are not necessarily configured as described above. Moreover, the order of the processing flows may be altered so long as the results of the processing do not change. The processing flows may also be conducted concurrently.

In the embodiments described above, the round robin algorithm is used as the algorithm for determining the transmission order of the frames, but another algorithm may be used.

The numbers of the buffers and processing units are not limited to the numbers described above.

In the embodiments described above, frames for each flow were processed, however frames for each port may also be processed if the classifying unit adds information to identify the ports to the frames.

Moreover, the inflow amount control described in the fourth and sixth embodiments may be conducted concurrently with the control of the packet discarding threshold described in the seventh and ninth embodiments. Consequently, the management of the shared buffer can be conducted with more flexibility.

A summary of the embodiments described above is as follows.

The relay device according to the first embodiment of the embodiments discussed herein has (A) a first buffer that stores a received frame; (B) a discarding unit that, when the first buffer stores the received frame, determines whether a utilization amount of the first buffer exceeds a first threshold due to a frame of a communication type that matches the communication type of the received frame when the threshold is set to the communication type, and discards the received frame if the first threshold is determined to have been exceeded; (C) a first calculating unit that calculates the utilization amount of the first buffer for each communication type at least two points in time, and calculates a numerical value indicating a change in the utilization amount of the first buffer for each communication type; and (D) a setting unit that calculates the first threshold for each communication type based on the numerical value indicating a change in the utilization amount of the first buffer, and sets the first threshold in the discarding unit.

By implementing the above processing, frame discarding by the communication type is suppressed and buffer overflow is rendered more unlikely. Thus, deterioration in communication quality may be suppressed.

The abovementioned setting unit (d1) may calculate a small first threshold that is smaller than the first threshold previously set in relation to the communication type, for a communication type in which the utilization amount of the first buffer increases, and calculates a first threshold not less than the first threshold previously set in relation to the communication type, for a communication type in which the utilization amount of the first buffer decreases. In this way, buffer occupancy and buffer overflow by a communication type that increases the utilization amount may be suppressed, and communication quality deterioration due to the discarding of frames for the communication type in which the utilization amount is decreasing may be suppressed.

The present relay device may further have (E) a determining unit that determines for each communication type whether to suspend the transmission of frames of the communication type based on the numerical value indicating a change in the utilization amount of the first buffer; and (F) an output unit that, when the determining unit determines to cause a transmission of a first communication type frame to be suspended, creates a suspension request to request a suspension of the transmission of the first communication type frame, and outputs the suspension request to a transmission source device of the first communication type frame. In this way, for example, even a communication type with a low allowance level for frame discarding (e.g., FCoE) and a communication type that noticeably increases a buffer utilization amount may be handled appropriately.

Additionally, the present relay device may further have (G) a second calculating unit that calculates for each communication type a transmission priority level based on the numerical value indicating a change in the utilization amount of the first buffer; and (H) a determining unit that determines a transmission schedule of the frames stored in the first buffer based on the transmission priority level. As a result, buffer occupancy and the like by a specific communication type may be suppressed.

Moreover, the present relay device may further have (I) a second buffer that stores a received frame so that the frame output from the second buffer may be input in the first buffer. The abovementioned output unit (f1) may determine whether, when the received frame is stored, a utilization amount of the second buffer exceeds a second threshold due to a frame of a communication type that matches the communication type of the received frame when the threshold is set to the communication type, and (f2) may output a suspension request to a transmission source device of the received frame to request a suspension of frame transmission. As a result, changes in communication states may be handled with flexibility.

Moreover, the numbers of the abovementioned second buffer and the discarding unit may be more than one. The received frame may be stored in any of the second buffers according to the communication type of the frame, and one different discarding unit among the discarding units may be associated with a respective second buffer. Discarding of frames for each communication type and the determining of transmission suspension may be conducted effectively.

The relay device according to the second embodiment of the embodiments discussed herein has (J) a first buffer that stores a received frame; (K) a first calculating unit that calculates the utilization amount of the first buffer for each communication type at least two points in time, and calculates a numerical value indicating a change in the utilization amount of the first buffer for each communication type; (L) a second calculating unit that calculates a first threshold for each communication type for a frame inflow data amount per unit of time based on the numerical value indicating a change in the utilization amount of the first buffer; and (M) a control unit that stores the received frame in the first buffer when the inflow data amount per unit of time of a frame of a communication type that matches the communication type of the received frame is equal to or below the first threshold calculated in relation to the communication type of the received frame even if the received frame is stored in the first buffer.

Implementing the above processing enables the relay device to flexibly handle buffer overflows since an appropriate inflow data amount is set with respect to changes in the buffer utilization amount. Thus, deterioration in communication quality may be suppressed. Since a limitation to the inflow data amount is established, the processing is also effective for a communication type (e.g., FCoE) with a low allowance for frame discarding.

The second calculating unit described above may calculate the first threshold for each communication type so that the first threshold set in relation to a communication type in which the utilization amount of the first buffer increases is smaller than a first threshold set in relation to a communication type in which the utilization amount of the first buffer decreases. In this way, buffer occupancy and buffer overflow by a communication type that causes the utilization amount to increase may be suppressed and excessive restriction of the bandwidth of the communication type in which the utilization amount is decreasing may be suppressed.

The present relay device may have (N) a second buffer that stores a received frame before the first buffer; and (O) an outputting unit that, when the received frame is stored, determines whether a utilization amount of the second buffer exceeds a second threshold due to a frame of a communication type that matches the communication type of the received frame when the second threshold is set to the communication type, and outputs a suspension request to a transmission source device of the received frame to request a suspension of frame transmission when the second threshold is determined to have been exceeded. As a result, changes in communication states may be handled with flexibility.

Moreover, the number of the abovementioned second buffers may be more than one, and a received frame is stored in any one of the plurality of second buffers according to the frame communication type. In this way, managing the inflow data amount for each communication type and determining transmission suspension may be conducted effectively.

The relay device according to the third embodiment of the present embodiments may have (P) a buffer that stores a received frame; (Q) a calculating unit that calculates a utilization amount of the buffer for each communication type at least two points in time, and calculates a numerical value indicating a change in the utilization amount of the buffer for each communication type; (R) a determining unit that determines for each communication type whether to suspend the transmission of frames of the communication type based on the numerical value indicating a change in the utilization amount of the first buffer; and (S) an output unit that, when the determining unit determines to cause a transmission of a first communication type frame to be suspended, creates a suspension request to request a suspension of the transmission of the first communication type frame, and outputs the suspension request to a transmission source device of the first communication type frame.

According to the above processing, the transmission of frames is appropriately suspended in correspondence with a change in the buffer utilization amount for each communication type. Thus, buffer overflows and deterioration in communication quality may be suppressed.

The control method according to the first embodiment of the embodiments discussed herein includes (T) calculating the utilization amount of the buffer for each communication type at two or more points in time, and calculating a numerical value indicating a change in the utilization amount of the buffer for each communication type; and (U) calculating a threshold for each communication type for discarding frames based on the numerical value indicating a change in the utilization amount of the buffer; and (V), when the received frame is stored in the buffer, discarding the received frame when the utilization amount of the buffer exceeds the threshold due to a frame of a communication type that matches the communication type of the received frame when the threshold is set for the communication type.

The control method according to the second embodiment of the present embodiments includes (W) calculating the utilization amount of the buffer for each communication type at least two points in time, and calculating a numerical value indicating a change in the utilization amount of the buffer for each communication type; (X) calculating a threshold of a frame inflow data amount per unit of time based on the numerical value indicating a change in the utilization amount of the buffer; and (Y) storing of the received frame in the buffer when the inflow data amount per unit of time of a frame of a communication type that matches the communication type of the received frame is not more than the threshold calculated for the communication type of the received frame even if the received frame is stored in the buffer.

The control method according to the third embodiment of the embodiments discussed herein includes (Z) calculating a utilization amount of the buffer for each communication type at least two points in time, and calculating a numerical value indicating a change in the utilization amount of the buffer for each communication type; (AA) determining for each communication type whether to suspend the transmission of frames of the communication type based on the numerical value indicating a change in the utilization amount of the buffer; and (AB) when a transmission of a first communication type frame is determined to be suspended, creating a suspension request to request a suspension of the transmission of the first communication type frame, and outputting the suspension request to a transmission source device of the first communication type frame.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay device comprising:
a buffer configured to store a received frame; and
one or more processors configured to:
discard the received frame, when a utilization amount of the buffer exceeds a first value set corresponding to a communication type of the received frame;
calculate the utilization amount for each communication type of the received frame stored in the buffer at least two points in time, and calculate an amount of change in the utilization amount for each communication type of the received frame stored in the buffer;
calculate the first value for each communication type based on the amount of change in the utilization amount for each communication type of the received frame stored in the buffer, and set the first value;
calculate a second value smaller than the first value previously set corresponding to the communication type in a case that the utilization amount of the buffer increases in the communication type, and set the second value; and
calculate a third value equal to or greater than the first value previously set corresponding to the communication type in a case that the utilization amount of the buffer decreases in the communication type, and set the third value.

2. The relay device according to claim 1, wherein the one or more processors are further configured to:
calculate a transmission priority level for each communication type, based on the amount of change in the utilization amount of the buffer; and
determine a transmission schedule of a frame stored in the buffer, based on the transmission priority level.

3. The relay device according to claim 1, wherein the one or more processors are further configured to:
calculate a transmission priority level for each communication type based on the amount of change in the utilization amount of the buffer; and
determine a transmission schedule of a frame stored in the buffer, based on the transmission priority level.

4. A relay device comprising:
a first buffer configured to store a received frame; and
one or more processors configured to:
calculate a utilization amount of the first buffer at least two points in time for each communication type, and calculate an amount of change in the utilization amount of the first buffer for each communication type;
calculate a first value for each communication type for a frame inflow data amount per unit of time, based on the amount of change in the utilization amount;
store the received frame in the first buffer when the frame inflow data amount per unit of time corresponding to a communication type of the received frame is equal to or smaller than the first value calculated corresponding to the communication type of the received frame; and
calculate the first value for each communication type so that a second value set corresponding to a first communication type in which the utilization amount of the first buffer increases is smaller than a third value set corresponding to a second communication type in which the utilization amount of the first buffer decreases.

5. The relay device according to claim 4, further comprising:
- a second buffer configured to store the received frame before the first buffer storing the received frame, wherein
- the one or more processors are further configured to transmit a suspension request signal to request a suspension of a frame transmission to a transmission source device of the received frame, when the utilization amount of the second buffer exceeds a fourth value set corresponding to the communication type of the received frame.

6. The relay device according to claim 5,
- wherein a number of the second buffers is more than one, and
- the received frame is stored in any one of the more than one second buffers according to the communication type of the received frame.

* * * * *